(12) United States Patent
Parker et al.

(10) Patent No.: US 6,274,048 B1
(45) Date of Patent: Aug. 14, 2001

(54) SYSTEM FOR ALLEVIATING DNAPL CONTAMINATION IN GROUNDWATER

(75) Inventors: Beth Louise Parker; Matthew David Nelson; John Anthony Cherry, all of Waterloo (CA)

(73) Assignee: University of Waterloo, Waterloo (CA)

( * ) Notice: Subject to any disclaimer, the term of this patent is extended or adjusted under 35 U.S.C. 154(b) by 0 days.

(21) Appl. No.: 09/532,784

(22) Filed: Mar. 22, 2000

(51) Int. Cl.[7] ................................................ C02F 1/72
(52) U.S. Cl. .................... 210/747; 210/758; 210/170; 405/128; 405/263; 588/248
(58) Field of Search .................... 210/747, 758, 210/759, 752, 170, 198.1, 908, 925; 405/128, 258, 52, 263; 588/248, 206

(56) References Cited

U.S. PATENT DOCUMENTS

| | | | | |
|---|---|---|---|---|
| 5,061,119 | * | 10/1991 | Balthaus et al. | 210/747 |
| 5,993,660 | * | 11/1999 | Shook et al. | 210/747 |
| 6,019,548 | * | 2/2000 | Hoag et al. | 210/747 |
| 6,041,863 | * | 3/2000 | Lindsey | 210/747 |
| 6,099,206 | * | 8/2000 | Pennell | 210/747 |
| 6,190,092 | * | 2/2001 | Miller | 405/263 |

* cited by examiner

Primary Examiner—David A. Simmons
Assistant Examiner—Frank M. Lawrence
(74) Attorney, Agent, or Firm—Anthony Asquith & Co.

(57) ABSTRACT

Lenses of DNAPL suspended on clay strata in a sandy aquifer are treated with potassium permanganate. The solution is injected out into the aquifer from a port, and forms a horizontal disc of treatment liquid. The (heavy) liquid then gradually percolates down onto the DNAPL lens.

37 Claims, 7 Drawing Sheets

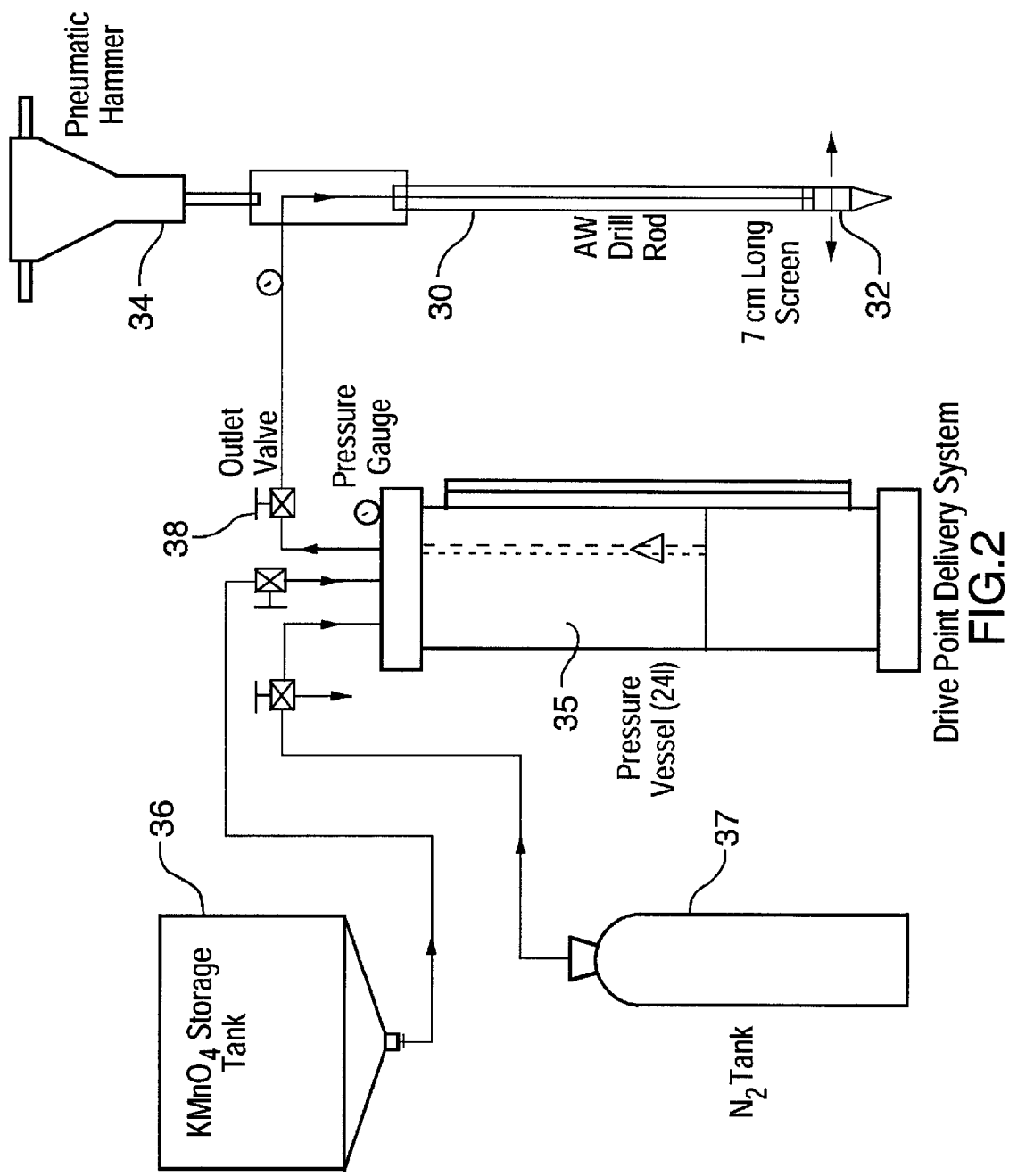

Plan View
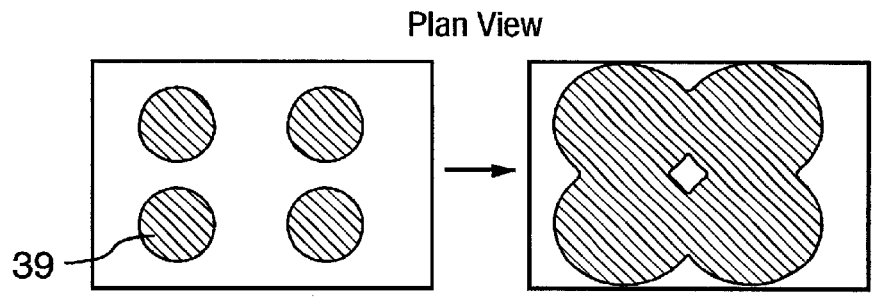
Time 0
FIG.3A
Time 1
FIG.3C
Cross Section
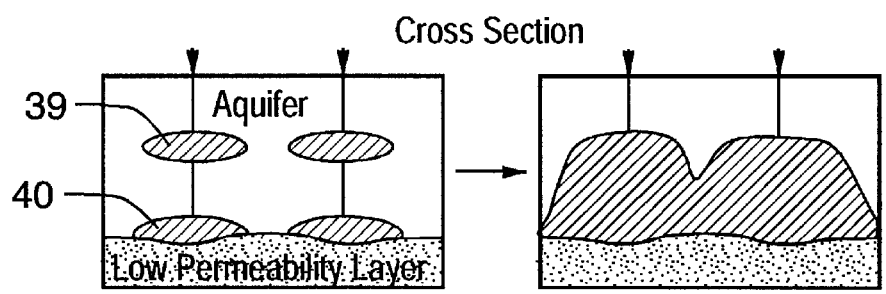
Time 0
FIG.3B
Time 1
FIG.3D
Plan View
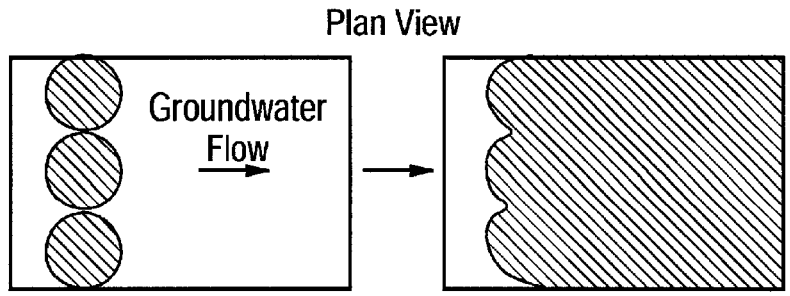
Time 0
FIG.4A
Time 1
FIG.4C
Cross Section
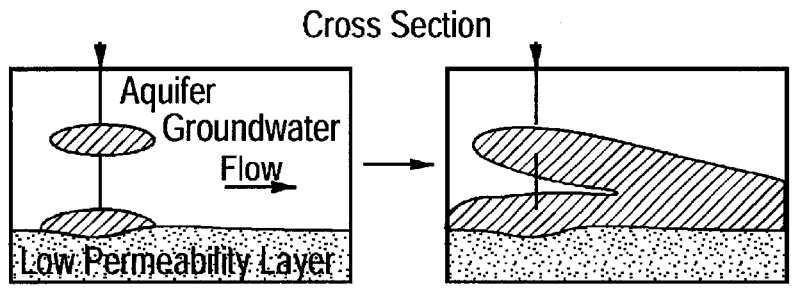
Time 0
FIG.4B
Time 1
FIG.4D Natural Conditions

| | degree of stratification of aquifer | hydraulic conductivity of aquifer | best possible disc-diameter metres | thickness cm | time to inject disc (hours) | depth of descent metres | time to descend days |
|---|---|---|---|---|---|---|---|
| 1. | high-strat | loose; >$10^{-3}$ | 3 - 5 | 30 - 50 | ½ - 1 | 2 | 7 |
| 2. | low-strat | loose | 2 - 3 | 50 - 70 | 1 - 2 | 3 | 3 |
| 3. | high-strat | tight; < $10^{-5}$ | 3 - 4 | 40 - 60 | 4 - 16 | 1 | 30 |
| 4. | low-strat | tight | 1 - 2 | 50 - 70 | 12 - 24 | 1 ½ | 20 |

FIG.7A

Engineered conditions

| Type of aquifer | liquid injected Litres | injection pressure psi | vertical spacing metres | horizontal spacing metres | time spacing days | port height cm |
|---|---|---|---|---|---|---|
| 1. | 1000 | 80 | 1 ½ | 3 | 7 | 10 |
| 2. | 800 | 40 | 2 ½ | 2 | 7 | 50 |
| 3. | 500 | 60 | 1 | 2 ½ | 30 | 20 |
| 4. | 400 | 30 | 2 | 1 ½ | 30 | 100 |

FIG.7B

| Diameter of disc D metres | Height of disc H cms | Aspect ratio D/H | Disc shape factor | Porosity of aquifer | Volume of injected disc litres |
|---|---|---|---|---|---|
| 1.5 | 50 | 3.1 | 0.166 | 30% | 175 |
| 2 | 50 | 4.1 | 0.154 | 30% | 290 |
| 2.5 | 50 | 5.1 | 0.142 | 30% | 418 |
| 3 | 50 | 6.1 | 0.130 | 30% | 551 |
| 3.5 | 50 | 7.1 | 0.118 | 30% | 680 |
| 4 | 50 | 8.1 | 0.106 | 30% | 799 |
| 4.5 | 50 | 9.1 | 0.095 | 30% | 902 |
| 5 | 50 | 10.1 | 0.083 | 30% | 977 |

SYSTEM FOR ALLEVIATING DNAPL CONTAMINATION IN GROUNDWATER

This invention relates to the treatment of contaminated groundwater, especially groundwater contaminated with DNAPL contaminants, such as PCE, $C_2Cl_4$, or TCE, $HC_2Cl_2$. The DNAPL (dense, non-aqueous-phase liquid) is present in the aquifer through which the groundwater passes. Generally, the DNAPL is present in the aquifer because the DNAPL has been spilled onto the ground surface from an industrial or commercial facility, and has soaked down into the ground.

The DNAPL existing in the subsurface as an immobile oily liquid causes the groundwater flowing by or through the DNAPL zones to pick up dissolved contaminants that are carried with the flowing groundwater to form a contaminant plume. Hence, the subsurface overall polluted zone comprises the DNAPL zone and the plume caused by the DNAPL zone.

The spill might have arisen due to a one-time accident that released a quantity of the DNAPL onto the ground; or the spill might have originated as a long-term continuing leakage from a pipe or storage tank; or the spill might even have arisen because the DNAPL was deliberately dumped onto the ground at a disused corner of the property.

DNAPLs such as those mentioned above are commonly used for cleaning metal components in manufacturing industries, as well as for dry-cleaning clothes. Once in the ground, the DNAPL can be expected to persist for decades, or even centuries. Groundwater pollution caused by DNAPLs exists at many thousands of industrial and other sites, both active and abandoned.

To achieve permanent remediation of the polluted subsurface zones, both the DNAPL and the dissolved and sorbed contamination should be removed and destroyed.

BACKGROUND TO THE INVENTION

It is known that organic solvents such as chlorinated ethenes and other DNAPL substances can be broken down by exposure of the DNAPL substance to a strong oxidant.

It is also known to treat groundwater contaminated with chlorinated ethenes in-situ, i.e the contaminated groundwater is treated in the aquifer through which the groundwater is passing.

Conventionally, the treatment has been done by flushing, i.e by injecting the oxidant into the ground upstream of the contaminant, and drawing water out downstream, the intention being to pass the oxidant over and through the contaminated zone, and thereby bring about the destruction of the contaminant.

The oxidation reaction transforms the chlorine component of the contaminant into a harmless chloride salt. The resultant chloride, as produced by the oxidation reaction, may be ignored, at least in the small concentrations that are produced.

Oxidants that have been used conventionally to break down chlorinated ethenes include hydrogen peroxide, and permanganate, such as potassium permanganate. As mentioned, these substances have been injected upstream and drawn off downstream, the intention being to promote a flushing action. But conventional flushing, as a way of remediating DNAPL contaminants, is inefficient, and can be incomplete. The invention is aimed at promoting the breakdown reaction, for example the oxidation reaction, in a way that is substantially more efficient, and more economical, than flushing.

The invention is aimed at causing destruction of the contaminants in whatever form they occur in the ground, whether they are in the DNAPL form, sorbed on soil particles or dissolved in the groundwater. In the invention the treatment chemical in liquid form, that is substantially denser than water such as a permanganate solution for oxidation of the contaminants, is injected into the aquifer from a borehole so as to react with the contaminants. While the treatment liquid is being injected, it spreads out quickly into the aquifer to form a discrete zone extending from the borehole. The borehole used for the injection allows the treatment fluid to enter the aquifer only in a specified discrete open interval along the vertical extent of the borehole. For example, this open vertical interval may be 0.5 meters long. Thus, as the treatment liquid is injected through the open interval under gentle or moderate pressure, it forms a disc-like or ellipsoid-like zone substantially in the lateral direction in the aquifer. As the episode of applied injection pressure for the zone comes to an end, the treatment solution in the aquifer begins to spread laterally and also sink downward because of the effect of the density of the treatment solution and, as this spreading and sinking occurs, the treatment chemical also spreads because of molecular diffusion. Hence, these spreading processes cause the treatment chemical to invade a much larger volume of the aquifer than occurs during the injection period. To achieve the full advantage of this invasion, a period of time much longer than the injection period must pass to allow the spreading caused by density and diffusion to become complete or nearly so. As the treatment solution comes into contact with contaminants, it reacts with the contaminants to cause destruction of contaminant molecules. As this destruction occurs, treatment solution is consumed. The treatment chemical can also be consumed by reactions with the geological materials or other natural constituents in the aquifer. In some circumstances the mass of treatment solution put into the aquifer during the episode is not sufficient to destroy all of the contamination in the injected and invaded zones and therefore, another injection episode at or near this location may be needed. This second injection episode should occur after the invasion resulting from the first injection episode is complete or nearly so. Additional injection episodes may be needed to complete the desired degree of cleanup of the treatment zone. Thus, the full treatment of the targeted volume of aquifer may be achieved with only one injection episode or more episodes.

An aim of the invention is to provide versatility of treatment types, including its use to treat a specific layer or lens of contamination that has been found during investigations of the site. It also can be used to treat portions of an aquifer in which contaminant occurrence is known or suspected but the exact locations have not been determined. In the first type of use of the invention, the treatment may be focused towards a specific layer or lens-like zone of contamination. In contrast, in the second type of use, the invention may be used to enable the treatment chemicals eventually to invade the full volume of aquifer where treatment is desired but the whereabouts of the contaminants in this volume is not known in any detail.

Thus, the invention may be used to blanket a targeted volume of aquifer so that the treatment chemical will reach whatever contamination occurs in the volume. An important advantage of the invention is that the injection of the treatment liquid to form the immediate disc-like or ellipse-like zones in the aquifer is designed to occur in a manner that causes very little pushing away or displacement of the contaminated groundwater existing in the volume of aquifer being treated. After the injection period the spreading by density and diffusion causes no substantial displacement. This is much different from the flushing approach in which the treatment solution is forced by injection and, perhaps also by pumping of other wells nearby, to flow through the entire zone of the intended treatment zone. This is because the application of injection pressure is continual. It is particularly important, while blanketing the aquifer zone, to avoid pushing the contaminated groundwater out in front of the injected liquid because the water that is pushed out in front of the treatment liquid cannot then be treated. The systems as described herein avoid this excessive pushing-away of the contaminated water because when using the systems, two or more of the injected disc-like zones are formed in each borehole, one below the other, so that an initial gap or space exists between the disc-like zones. The gaps are substantially larger than the vertical heights of the injected discs after the injection period. The gaps are then filled in by the treatment chemical, because of the effects of density and diffusion. As this filling-in occurs, no lateral displacement of the contaminated groundwater takes place and therefore the contaminated groundwater in the gaps is treated, as well as the sorbed contaminants on the aquifer particles and any DNAPL that may occur in the gaps. The amount of treatment chemical injected during one episode may not be sufficient to accomplish the desired degree of treatment and therefore another injection episode later on at one or more of the depth levels in the borehole may be desired. Hence, the intended degree of treatment may be achieved by application of the treatment liquid episodically.

In addition to filling-in the vertical gaps between the initial disc-like zones, the treatment chemicals spread laterally beyond the outer limits of the initial disc because of the effect of the density of the treatment liquid. This lateral spreading is fostered by natural stratification that occurs in nearly all granular aquifers.

In aquifers where the DNAPL or other contaminants occur on top of or in the upper part of a lower permeability layer such as a silty or clayey layer the systems as described can be used efficiently to deliver the treatment chemicals to this zone. The injected disc-like zone of treatment liquid is formed by injection into the more permeable zone above but close to the silty or clayey layer. Then, the dense treatment liquid sinks onto and into the contamination and at the same time spreads out laterally along the top of the layer because of the density effect. Hence, the treatment liquid seeks out the contamination under its own influence. This spreading out effect enables a much larger area to be covered without having to continue the injection period. As the density effect causes the treatment liquid to spread out laterally along the top of the lower permeability layer, the vertical height (i.e. thickness) of the zone of treatment liquid generally becomes thinner so that outward displacement of contaminated water in front of the treatment zone is very small. Hence, the treatment chemical is caused to seek out the contaminant layer efficiently so that only a minimal amount of the treatment solution is consumed by reaction with the natural aquifer material. This leaves nearly all of the treatment chemical available to destroy the contaminants. If the mass of contamination in the zone along the silty or clayey layer is considerable, more than one injection episode may be desired. In this case, the treatment may be done episodically.

When the treatment chemical such as permanganate comes into contact with the contaminant, it reacts with it to cause destruction of contaminant molecules and, at the same time molecules of the treatment chemical are consumed by the reaction. This process of consumption of the treatment chemical causes the treatment liquid not to spread or sink as much as it would otherwise. This is another reason why a second or even additional injection episodes may be necessary at a single injection location so that the treatment liquid can be made eventually to invade or occupy the full volume or area for which treatment is desired.

The reaction of the treatment chemical with the contaminant causes consumption of molecules of the treatment chemical at the particular locations where the contaminants exist. This decline in concentration of the treatment chemical causes diffusion to continually move more treatment molecules towards the contamination, and contaminants towards the treatment solution. Thus, the injection and density-induced spreading of the treatment liquid need not bring the treatment molecules exactly into contact with the contaminants because diffusion also works to bring this contact into effect.

THE INVENTION IN RELATION TO THE PRIOR ART

The chloro-organic DNAPL contaminants are only sparingly soluble in water. Typically, the DNAPL might be soluble to a concentration of around 1000 mg per liter of groundwater. But even tiny traces can be harmful in drinking water. The water solubility of most DNAPLs, though small, is still much larger than the concentration levels that can be allowed.

As a liquid, the DNAPL is oily, and sticky, and tends to be retained in the pores of the aquifer material more tenaciously than groundwater. DNAPLs are immiscible with water, and the oily liquid tends to collect in lenses, usually in the form of thin horizontal layers or lenses, where the DNAPL occupies much of the pore space. What often happens is that the lenses of DNAPL remain more or less stationary within the aquifer, while the groundwater passes by at its natural velocity. The stationary lens of DNAPL is diminished only by the quantity of the DNAPL that dissolves into the passing water and is borne away.

A lens of DNAPL, which lies stationary and suspended within the aquifer, is able, over a long period of time, to yield contaminant into the water, up to the maximum concentration the water will carry in solution. Each day, the few milligrams of DNAPL that it takes to saturate the passing water are stripped from the lenses, but the main bulk of the lenses remains intact, and able to supply these milligrams; often, the lenses of DNAPL are so large that this natural diminution will take decades or centuries.

Conventional flushing addresses the stationary lenses of DNAPL only inefficiently. Conventional flushing mixes the injected oxidant in with the groundwater, whereby the oxidant moves along with the moving groundwater. (The flushing operation itself can have the effect of imposing an extra velocity on the moving groundwater.) The oxidant dissolved in the moving groundwater breaks down the chlorinated organic contaminants dissolved in the moving groundwater.

The presence of oxidant in the groundwater can be very effective at breaking down and removing the tiny quantities of chloro-organic contaminant dissolved into the water. Thus, the water that emerges from the treatment zone is decontaminated.

Flushing requires excessive quantities of oxidant, even when the oxidant is being recirculated and recycled. Flushing has to be carried on for as long as the lenses of DNAPL are releasing the contaminants into the passing water. Flushing, theoretically, has to be carried on for the whole period of years before the lenses of DNAPL are depleted down to nothing.

Generally, each lens of DNAPL, once the lens has become retained and suspended in the aquifer, remains in place over time, and is not physically dislodged by the passing groundwater. A porous aquifer tends to have preferred pathways along which the groundwater travels, while water in the bulk of the aquifer moves much more slowly. The lenses of DNAPL tend to collect on top of geological layers of lower permeability where the groundwater is slower-moving. A stationary lens of DNAPL might lie close by one of the pathways, releasing contaminant constantly into the relatively fast-moving groundwater.

Although flushing puts large quantities of oxidant into the groundwater, much of the oxidant is wasted because it reacts with the natural geologic media, and loses its oxidation capacity. By forcing the oxidant to flow everywhere, with the flushing approach, the oxidant capacity is used up less by destroying DNAPL and more by reaction with the geologic media. This is inefficient, and, while this inefficiency is in effect, the injection wells and withdrawal wells must be operated, which consumes energy and requires considerable maintenance because the oxidant is generally very corrosive.

In one aspect, the invention aims to provide accurate and pre-determined positioning of the treatment material, right where it will be most effective. Although this is useful generally, it is especially so in the case of strong oxidants, because strong oxidants tend to degrade and break down naturally quite rapidly in the ground, in that a strong oxidant will react with many things that might be present in the ground. The aim is to provide a system whereby it becomes possible to focus the delivery of relatively small quantities of the treatment material, accurately right onto the lens of DNAPL, and is therefore advantageous when applied to short-lived treatment materials, which is what strong oxidants can be expected to be.

The invention may be contrasted with the treatment procedures that involve flushing or flooding the aquifer with large over-quantities of treatment material.

In one aspect, a system of the invention involves first determining generally where the lenses of DNAPL or other contaminant are located, as to their depth and thickness, and as to their lateral extent. This need not involve physically detecting where all the DNAPL is located, which would be very expensive, but rather involves determining the layering characteristics of the contaminated area, whereby the positions of the lenses can be determined by calculation and inference, as much as by actual measurement.

Next, boreholes are formed down into the zones where the concentrated contaminant is located. An injection device is placed in the borehole, and the device includes a port, through which treatment material can be ejected, laterally, from the port, out into the surrounding aquifer material.

It is recognised that the injected (liquid) treatment material tends to form a horizontal disc of liquid. The presence of the horizontal layers of lower-permeability material is what led, as described, to the formation of the lenses of DNAPL. Rather, the aquifer material itself is stratified, even without the specific layers of clay. It should be understood that the reference to lower-permeability layers should not be construed as a limitation that DNAPL collects only on clay. Sometimes, the geological layers on which DNAPL lenses can form might be just sand with a little clay or silt, or even just smaller sand grains. This indistinct geological layering gives rise to many lenses, some very small and shallow, others deeper and more extensive. As will become clear, the treatment system is effective in a many-small-lenses context, as well as in the few-large-lenses context. It should be understood that the horizontal stratification of the aquifer is not only important from the standpoint of how the DNAPL lenses have come to rest in the aquifer, but is also important from the standpoint of how the treatment liquid behaves when it is injected into the aquifer.

The stratification of the aquifer material is such that liquid injected into the aquifer from a central point naturally tends to form a distinct disc. That is to say, liquid ejected from a port in a borehole, outwards into an aquifer, tends naturally to form a distinct horizontal disc, and not just to disperse equally in all directions. It will be understood that the injected liquid displaces the liquid (groundwater) that is already present in the pores of the aquifer; and the path of least resistance for the displaced water is predominantly horizontal. The path of the displaced water is not likely to be within the actual layer containing the DNAPL, hence the injected solution will tend to flow adjacent to the DNAPL.

The treatment liquid being injected of course is under pressure. However, preferably the pressure should be only enough to make the liquid actually move out into the aquifer, against the pressure of the groundwater already present in the aquifer. The ejection should be done smoothly and gently. The ejected liquid does not acquire its horizontal directionality simply from its velocity of ejection. The tendency of the injected treatment liquid to form a flat horizontal disc of liquid arises from the layered nature of the aquifer, as well as from the manner of injection. For the invention to be successful, the aquifer material should be sufficiently stratified that treatment liquid ejected outwards from a port forms a disc of a diameter of the order of one or two meters, and a vertical thickness of the disc of no more than a few centimeters, or tens of centimeters.

The treatment liquid should be ejected from the port slowly and gently. The intention is not to dislodge the lens of DNAPL physically. The DNAPL should not be moved or disturbed, because then its location would have to be re-detected, and because then it might be even more difficult to reach. The intention is that, after injection, the treatment material now fills the disc space: that is to say, the disc of treatment material is a coherent whole volume, and has not broken up into small fragments.

Of course, this status of the treatment material as a coherent or unitary horizontal disc will not last very long after ejection has finished. For one thing, the treatment material starts to diffuse, and starts to become diluted by diffusion into the surrounding groundwater.

Preferably, the treatment material should start to sink. Therefore, preferably, in the invention, the treatment material should be denser than the groundwater. A potassium permanganate solution of 30 grams per liter, for instance, has a density 1.02 times that of water. But the more dilute the solution, the less dense it becomes. A coherent disc of even a lightly concentrated potassium permanganate solution, will sink quite sharply, and percolate down through the pores in the aquifer. If the disc has been well placed, the descending permanganate solution will settle onto the lens of DNAPL.

If the ejected permanganate solution was not in a coherent disc, but was broken up and dispersed over the ejected area (e.g by being ejected too roughly), the tendency would be for the solution to quickly lose concentration, i.e to become diluted. The more the ejected volume remains as a coherent unit, the longer the time the solution stays dense. It is noted that, as the solution becomes diluted, it loses density, and then of course loses its tendency to sink. The solution cannot be expected to retain concentration forever, as it descends through the aquifer.

The disc of permanganate solution would be ideally placed if, just after injection, the disc were to reside directly on top of the lens of DNAPL, and were to be co-extensive with the lens. ideally, there would be no lower-permeability layers between the disc of permanganate solution and the lens of DNAPL, and the treatment material quickly permeates downwards, and attacks the DNAPL in the lens.

Of course, the situation will not be ideal. The disc will not overlie the lens exactly, and the ground material might contain some slight non-homogeneities which might cause the downwards movement to be deflected sideways. Also, there might be an appreciable natural groundwater velocity, which will deflect the falling liquid. But it is recognised that the above-described system for delivering potassium permanganate solution to a lens of DNAPL, though not perfect, is a good deal more closely focussed and accurate and concentrated than previous delivery systems.

The delivery system as described will not function unless the treatment material is denser than water. The invention is not limited to the treatment material being potassium permanganate, or even being permanganate, but potassium permanganate is a strong oxidant; is heavier than water (at least in concentrated solutions); is reasonably economical to obtain in the quantities required; and is easy to handle.

It is important that the volume of treatment liquid ejected be correct. It has been found that the particular aquifer conditions will support the formation of a given size of disc. That is to say, under certain aquifer conditions, a particular treatment-volume of concentrated permanganate solution, upon being ejected (gently) into the aquifer, will form a disc of a particular diameter, and depth. Although sometimes, by chance, conditions will favour the production of a larger disc, usually the disc will not go larger or any more concentrated if more than the treatment-volume is ejected.

Rather than try to inject more treatment liquid all at once, the engineer should wait until the injected disc has percolated down and away. When that has gone, there is plain groundwater once again, where the disc was. This might take several days. Then, a further treatment-volume of treatment material may be ejected. Again, this is done gently, and at a relatively small pressure differential above the groundwater pressure, so as to create as little disturbance as possible. The intention is to replace groundwater with a coherent disc of concentrated potassium permanganate solution. That has to be done gently in order to keep the disc coherent.

Of course, the designer of the system will need to see to it that more treatment liquid is injected into the ground than is theoretically needed to deal with the DNAPL, because some will inevitably be wasted. However, it is an aim of the invention that far less of the treatment liquid will be wasted than has been the case in previous DNAPL treatment systems, such as flushing. It is an aim of the invention to achieve the destruction of the DNAPL in the lenses by the use of relatively small injected volumes, within the overall much larger volume of the aquifer.

The rate at which the treatment liquid is being ejected from the port should be monitored, as should the pressure at which it is being ejected. It is intended that the velocities in the groundwater, in the disc area, during injection, should be small and gentle, and that little or no movement of the groundwater should be projected outside of the disc area. After the injection pressure is removed, the injected liquid will gradually start to permeate downwards, but it will be understood that this movement is even more gentle.

It can be helpful to do tests to determine the volume that should not be exceeded, in a particular aquifer. In fact, the volume that can be accommodated depends on the permeability and layering of the particular aquifer, so that a test as to the ideal injection volume done at one location can usually be followed at other adjacent locations in the aquifer. In another aquifer, however, the ideal volume (and the resulting diameter of disc of treatment material) might be quite different.

The treatment liquid should be injected slowly and gently. It is contrary to the system of the invention to use high ejection pressures, which perhaps might disrupt the system physically. Thus, the system of the present invention is quite different from jetting into the soil, or physically mixing the soil. It is also quite different from fracturing the soil, which has been used, in the prior art, to introduce discs of treatment material into clay. It is known, e.g from USA patent publication number U.S. Pat. No. 5,641,020 (Parker, June 1997), to inject treatment material into very low permeability material, such as clay. The clay is broken up, i.e cracked, by the process of hydraulic or pneumatic fracturing. The cracks may be propped open with sand etc. Treatment material can be injected into the cracks, and left. The treatment material diffuses (slowly) into the clay, chasing the contaminant that has seeped into the clay over many years. In that system, the process by which the treatment material reaches the contaminant is almost entirely diffusion, which is appropriate because the ground material has such low permeability.

However, the high-pressure fracture system is of no use in a sandy aquifer, and would usually make things worse. A system that violently displaces what was in the ground is disadvantageous when dealing with coalesced lenses of DNAPL, because it might disperse the DNAPL beyond the area of influence of the treatment material.

In the present case, by contrast, the major process by which the treatment liquid reaches the contaminant is simply the bodily movement, driven by gravity, of the treatment liquid down through the pores of a highly permeable sand/gravel aquifer. In the present case, the movement of the treatment liquid is in two distinct phases: first, actually during ejection from the port, the treatment liquid travels, with a measurable velocity, but still slowly and gently enough not to cause disturbance to the aquifer, radially and horizontally outwards; and second, after ejection ceases, the radial movement substantially ceases, and then the treatment material starts to sink, and to percolate down through the pores in the aquifer, allowing diffusion to allow the reaction between oxidant and contaminant to occur. Even though the initial treatment solution discs occupy only a minority portion of the intended treatment zone, the combination of processes indicated above is aimed at enabling more or less complete invasion throughout the zone.

DETAILED DESCRIPTION OF PREFERRED EMBODIMENTS

By way of further explanation of the invention, exemplary embodiments of the invention will now be described with reference to the accompanying drawings, in which:

FIG. 2 is a diagram showing some of the components of an apparatus for injecting a quantity of treatment liquid, below ground, through a port, out into the aquifer.

FIG. 3A is a plan view of some discs of treatment material that have been injected below ground;

FIG. 3B is a side elevation of the discs of FIG. 3A;

FIG. 3C is the FIG. 3A view after a period of time;

FIG. 3D is the FIG. 3B view after the period.

FIG. 4A is a plan view of some discs of treatment material that have been injected below ground, in which the groundwater has a natural velocity;

FIG. 4B is a side elevation of the discs of FIG. 4A;

FIG. 4C is the FIG. 4A view after a period of time;

FIG. 4D is the FIG. 4B view after the period.

FIG. 7a is a table showing the variations in natural aquifer conditions, as are relevant in practising the invention.

FIG. 7b is a table corresponding to FIG. 7a, showing how the invention may be engineered, considering the aquifer types.

The apparatuses shown in the accompanying drawings and described below are examples which embody the invention. It should be noted that the scope of the invention is defined by the accompanying claims, and not necessarily by specific features of exemplary embodiments.

Figure 1:
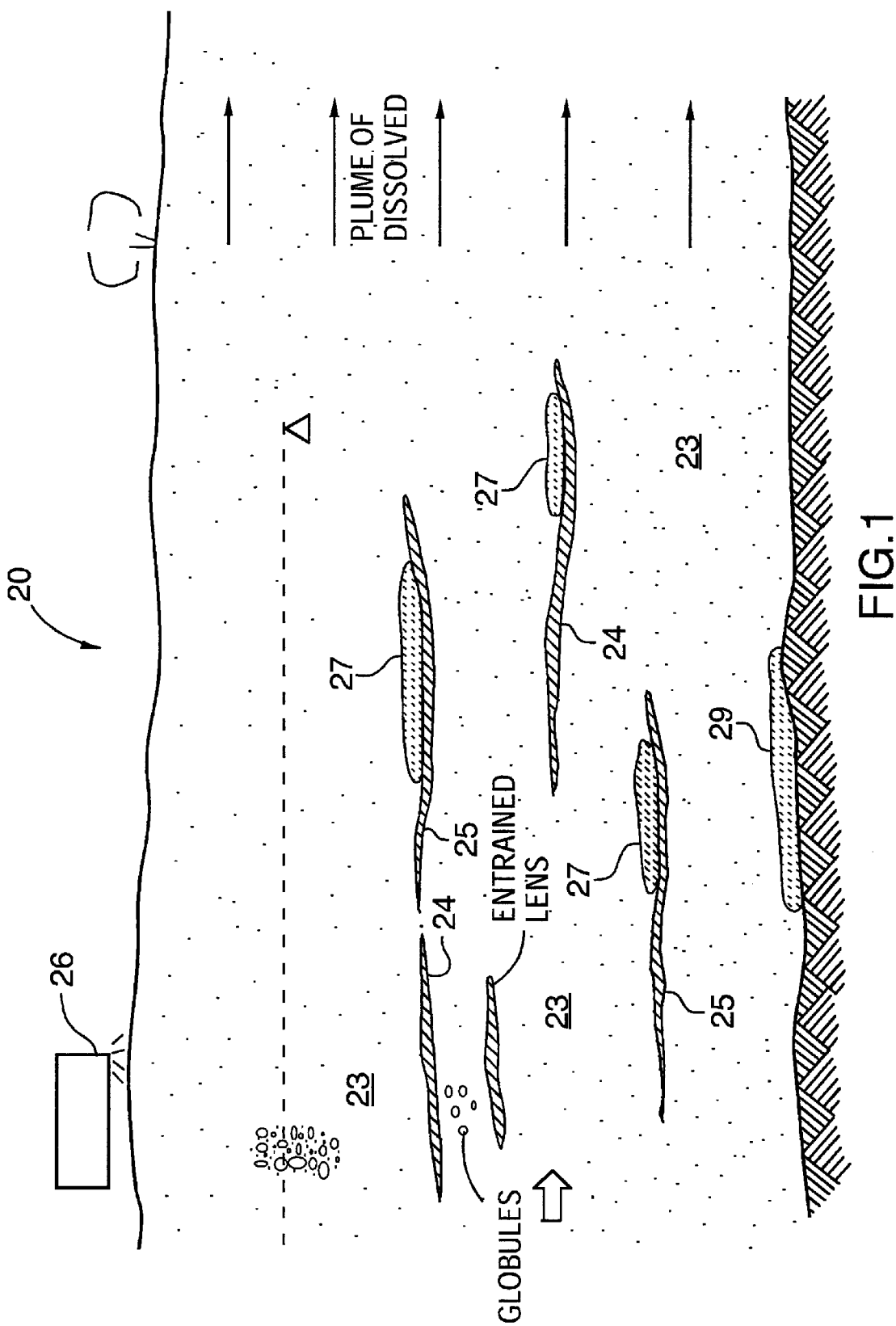
FIG. 1 is a cross-section of an aquifer, showing a spill of contaminant of the kind that can be dealt with by the system of the invention.

FIG. 1 is a cross-section of a site that has been contaminated with DNAPL. The aquifer 20 is basically porous sand/gravel, and groundwater occupies the pores. The aquifer material is generally homogeneous, as measured in the horizontal sense. However, in the vertical sense, the aquifer material is not homogeneous, but rather is stratified. The aquifer, having been laid down in layers, comprises here a basic matrix of sand/gravel 23, with here a stratum of silt 24, there a stratum of clay 25, etc, and the porosity/permeability of the layers, though reasonably uniform horizontally over one layer, is distinctly not uniform vertically, layer to layer.

The DNAPL, being heavier than the groundwater, sinks down into the groundwater, and into the aquifer material, from the spill-point 26 at the ground surface. Where the aquifer material comprises coarse sand and gravel, of high permeability, the downwards velocity of the DNAPL can be relatively high, and the tendency of the DNAPL to move laterally, by being borne along with the moving groundwater, is relatively small, while the DNAPL is descending through the layers of sand and gravel.

As the falling DNAPL encounters the less-permeable layers, however, the downwards flow is halted, or impeded, and the tendency is for the DNAPL now to undergo a lateral spreading movement. The resistance to downwards descent, through the silt or clay layer 25 (FIG. 1a), is greater than the resistance to lateral spreading, through the sand 23, along the top of the lower-permeability layer.

The movement of the DNAPL, laterally along the top of the lower-permeability layer 25, continues until a vertical crack or cranny in the layer once again permits downwards flow, or until the layer peters out. Where the configuration of the lower-permeability layer 25 includes a slight hollow or indentation, a volume 27 of DNAPL becomes hung up, resting on top of the layer 25.

Typically, a chlorinated solvent DNAPL such as TCE is oily, and tends to be highly resistant to mixing with water. What happens, over a period of time, therefore, is that the spill results in a number of large lenses of DNAPL, each more or less completely un-mixed with water, and isolated from each other. The lenses collect in the natural undulations and hollows on the occasional layers of silt and clay (or less permeable sand), which the DNAPL encounters in its generally downwards passage through what is basically a porous sand/gravel aquifer.

The extent to which isolated lenses 27 of DNAPL do tend to collect and become suspended at intermediate depths depends on the disposition of the intermediate layers of silt or clay or finer-grained sand. If the aquifer were basically homogeneous over its whole depth or height, with no silt or clay strata to speak of, then probably no substantial intermediate-depth lenses of DNAPL would collect. However, as the DNAPL descends through the aquifer, it leaves behind a trail of small globules or blobs that are immobile. This DNAPL as well as the lenses cause passing groundwater to pick up some of the contamination into solution.

However, sometimes, even in the case of a vertically-homogeneous aquifer, where a spill of DNAPL basically falls right through the aquifer, the DNAPL might come to rest on an impermeable or lower-permeability layer of clay or bedrock underlying the aquifer 20. The DNAPL would then again spread laterally, through the porous permeable aquifer matrix material 23 just above the lower-permeability base layer, i.e along the top of the lower-permeability layer. In that case, the DNAPL again would tend to form a large, coherent, coalesced lens 29.

If the homogeneous, porous, permeable aquifer is very deep, the DNAPL might descend all the way through, and become dispersed, as many small globules or blobs, and then have hardly any tendency to collect in lenses.

But generally, for the invention to be applicable, the main bulk of the aquifer is of porous, permeable sand/gravel, but the aquifer is stratified into horizontal layers or strata of clay or silt or finer-grained sand, etc, of a reduced permeability. For the invention to be most applicable, the DNAPL is in the form of coalesced lenses of DNAPL suspended upon the lower-permeability layers. The invention is still suitable for use where there are no intermediate clay layers, if the aquifer rests on lower-permeability bedrock or clay, and a lens of DNAPL resides in the porous, relatively high-permeability, material just above the lower-permeability level. For the invention to be of most use, the lenses of DNAPL should be more or less stationary.

In carrying out treatment, first the engineer undertakes a study of the area. This involves drilling wells, and drawing off groundwater samples, and groundsoil samples, at various locations and various depths. The main intent here is to obtain information which enables a general picture to be formed as to the general style or features of the geologic layering at the site, whereby, with experience, an estimate can be made as to just where the discs of treatment material should be injected. It is usually not possible, nor required, to plot the positions of the individual trails or lenses of DNAPL, as such.

In a typical aquifer, it may be expected that the coalesced lenses of DNAPL will vary from a vertical height or depth of a few centimeters and a horizontal extent of a few meters, containing just a few liters of DNAPL, to large lenses having a vertical depth of fifty cm and a horizontal extent of fifty meters, containing thousands of liters of DNAPL. The larger lenses can be expected to be encountered more on the rock or clay layer at the bottom of the aquifer, while the intermediate suspended lenses would be smaller.

In addition to establishing a plan of the site, plotting the area of contamination, the engineer should also establish the general porosity and permeability of the aquifer material. He should determine the lateral groundwater velocities, and variations thereto, and also the water table, and the variations thereto. Tests should be carried out to enable an estimate as to the optimum volume of treatment liquid to be injected, to optimise the formation of the discs.

FIG. 2 is a diagram illustrating the apparatus used to inject treatment liquid into the ground. The apparatus includes a hollow drill rod 30, having an ejection port 32. The drill rod is arranged so that treatment liquid can be passed down the hollows centre of the drill rod, from the surface. A hammer 34 is used to drive the drill rod into the ground. The drill rod is hammered down to the depth at which the treatment liquid is to be delivered. A charge of treatment liquid is placed in the pressure vessel 35, from the storage tank 36, and gas (nitrogen) pressure is admitted, from a pressurised bottle 37, into the vessel.

It is noted that the above design of injection apparatus has no moving parts exposed to the permanganate (which, being a strong oxidant, can cause damage to vulnerable components).

When the port 32 is at the desired depth, the valve 38 is opened, and liquid flows out of the port, and into the aquifer, thereby creating the disc of treatment liquid in the aquifer, as described. The apparatus includes gauges and instruments for monitoring the pressure and flow conditions, etc. As mentioned, the ejection should be done smoothly, slowly, and gently. Once the predetermined volume of treatment liquid has been ejected, the valve 38 is closed. (The valve may remain open during driving of the drill, and a positive pressure may be maintained, to guard against clogging of the port.

Now, the drill rod is moved to a different location, preferably to a different depth in the same hole. When all the ejections have been done at that hole, the drill rod is taken out, and moved to the next location, where the drill rod is again driven into the ground, to the desired depths, and the ejections made, one after another.

FIG. 3A is a plan view showing a grid of four injection locations. In this case, as shown in elevation, FIG. 3B, only one disc 39 is created in each hole. The discs have been positioned over respective lenses 40 of DNAPL. As shown in FIGS. 3C and 3D, the treatment liquid descends and percolates through the aquifer material, down onto the DNAPL lenses 40.

FIGS. 4A,4B,4C,4D show the corresponding effects when the groundwater is naturally subjected to a substantial lateral velocity.

When the groundwater has a substantial velocity, it can be difficult to ensure that the treatment liquid falls accurately onto the (stationary) lenses of DNAPL. However, if the velocity is constant, the treatment liquid can still be aimed reasonably accurately. If the natural velocity of the groundwater were much above 1, or perhaps 2, meters a day, however, the ability to focus the delivery of the treatment liquid might then be lost.

In another aspect, the invention can be used to blanket a selected area with treatment liquid. If the lens of DNAPL is very large, or if there are several small lenses in a localised area, or if the engineer knows there are lenses there, but cannot plot their extent exactly, blanketing can be resorted to. Of course, blanketing wastes treatment liquid, as compared with specifically aiming the treatment material at the specific lenses of DNAPL, whose location is accurately known. However, blanketing in the context of the present invention is quite different from the type of overall flooding that occurs with flushing, as described above. Compared with flushing, in the invention, blanketing can still be much more precise and accurate as to its area of activity. A delimited area can be blanketed with treatment material, which, if done carefully, can be expected to reach virtually every crack and cranny of the aquifer, and still be concentrated enough to be effective to break down any contaminant it reaches.

It should be noted that blanketing, in the invention, still requires that only a very small volume of treatment liquid be injected. If the location of the lenses is known precisely, of course the delivery can be done precisely. But even when the position of the lenses is known only generally, blanketing is appropriate. What blanketing means is this, that enough discs are injected, as to grid-positioning, and, as to vertical spacing, that after a time the liquid permeating down from the discs has passed through the whole depth, to leave preferably no vertical gaps. It may be regarded as a desideratum, in the invention, that the concentrated liquid of the disc would descend, as a disc, i.e that the disc itself would permeate downwards, as a disc, leaving the space above, which the disc has just vacated, full of clear water. Of course, the concentrated liquid does diffuse and lose concentration, so the disc does not actually descend as a coherent body of uniformly-concentrated liquid; however, it is recognised that, in the context of the treatment systems as described herein, as the liquid permeates down through the aquifer, it does so as much by bodily descent of the still-concentrated treatment liquid, leaving relatively clear water in the vacated space above, as by diffusion and dilution.

With blanketing, there is less need for detailed measurements of the outlines of the lenses. In some cases, all the engineer can do, as regards mapping, amounts to no more than establishing that there is some DNAPL down there, somewhere, within a limited area.

Figure 5:
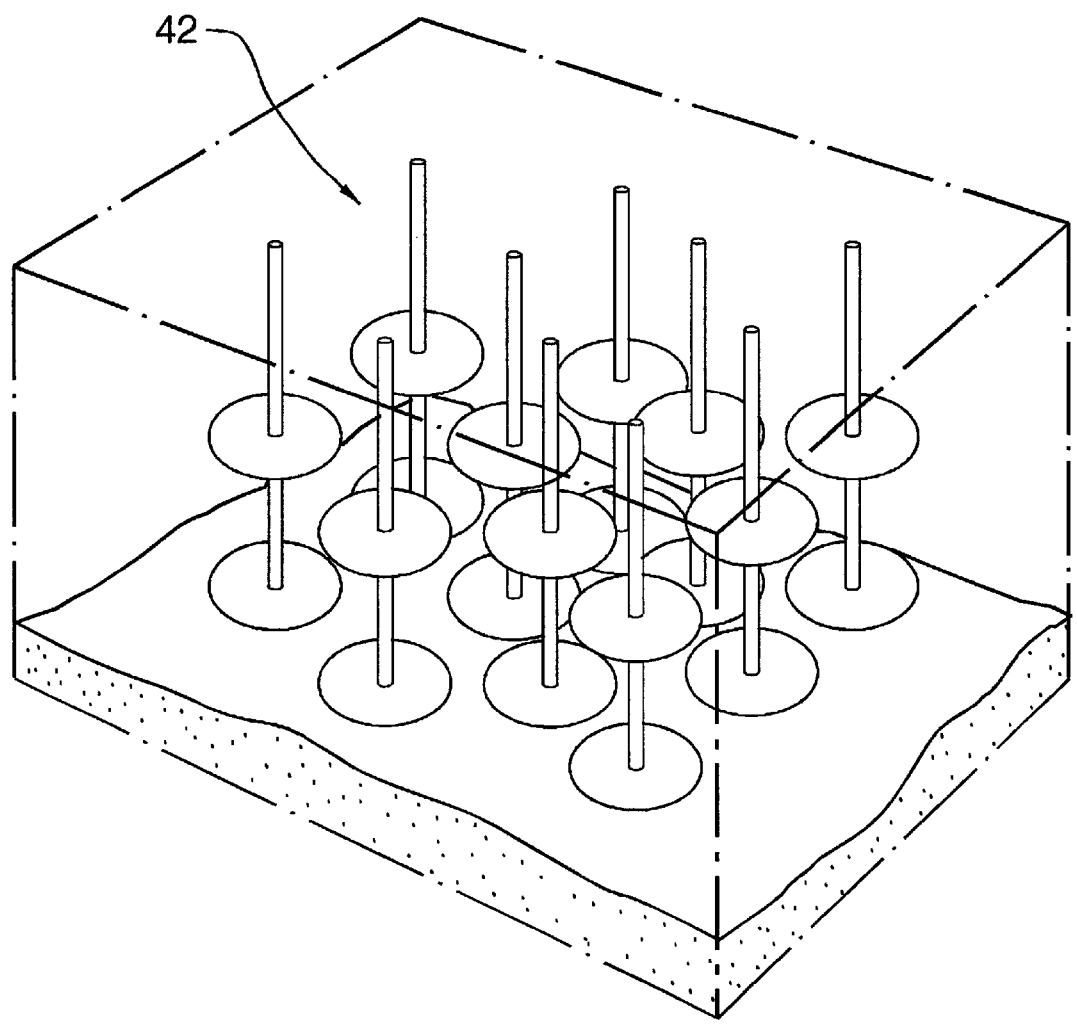
FIG. 5 is a diagram showing a volume of an aquifer that is blanketed with ejected discs of treatment material.

FIG. 5 shows an installation for blanketing treatment, in which ejections of treatment liquid are made over a regular grid 42 of holes, and at regularly spaced depths in those holes. Again, it will usually be necessary to come back to the site, and inject further batches of treatment liquid at each location all over again, and perhaps to do this several times. Especially when the blanketing approach is taken, it does not matter if the new grid of holes does not precisely line up with the original grid. Typically, the ejection points would be 1.5 meters apart on the grid, and the injections would be done at vertical intervals of one meter. After the treatment material has been ejected into the many discs, the liquid spreads and overlaps, both laterally and vertically, thereby flooding the whole volume with concentrated solution.

When blanketing, especially when there is a substantial groundwater velocity, some treatment liquid can be expected to pass through the treatment area without encountering any lenses of DNAPL. However, the treatment liquid is then borne downstream, with the moving groundwater, where it can serve to break down any dissolved contaminant it happens to encounter. Even with the blanket approach, however, the amount of wastage of treatment liquid is kept to a minimum, which is good from the economy standpoint, and from the standpoint that putting too much manganese into groundwater can be harmful.

Generally, the practice will be to inject the discs of treatment material one at a time. That is to say, the drill has just one port, and the injections at the different depths in the aquifer are done by moving the drill rods up or down.

However, it might alternatively be arranged that the drill has several ports, one above the other, whereby several injections can be made simultaneously. In that case, it is important to ensure that each port receives its correct volume quota of treatment liquid. If the ports are connected together, the upper ports, at which the injection pressure is smaller, will receive most or all of the available volume. When injecting at multiple depths simultaneously, provision should be made for the injections to be done at different pressures, and the volumes kept isolated.

The breakdown reaction of the chlorinated ethene produces measurable traces of chloride in the water, and the presence of these traces can be used to confirm that the breakdown has been taking place. When seeking to determine whether treatment has been successful, a test may be done to determine the presence of the chlorinated ethene; but a negative result on that test might just mean that the contaminant is still present but not at the place where the sample was taken; but if chloride is detected, that is an indication that the oxidation breakdown reaction has indeed been effective.

The oxidant itself breaks down as a result of the treatment reaction. If the lens of contamination is large, the oxidant must be replenished, i.e more and more oxidant must be brought into contact with the remaining still-untreated DNAPL in the lens, over a period of time. If oxidant is detected as being still present, that either means that the oxidant has not reached the chloro-ethene, or that more oxidant has been provided than was needed to completely break down the quantity of contaminant. TCE and PCE are broken down quite easily upon contact with a strong oxidant, in that all that is needed to make the reaction take place is to bring the strong oxidant into contact with the DNAPL. In fact, if the oxidant is placed even somewhere near the DNAPL, it will move by diffusion into contact with the DNAPL.

The invention requires that the aquifer be porous and permeable. The invention is mainly applicable when the permeability of the aquifer material is more than $10^{-5}$ cm/sec. The limit of permeability of the aquifer material, beyond which the invention would not be applicable, is about $10^{-6}$ cm/sec. If the permeability is below that, the injected material will not display the required characteristic of the invention, that the treatment material, immediately upon being injected, forms a horizontal disc, centred on the borehole.

The speed of ejection of the treatment liquid should be small enough that induced (and direct) currents in the surroundings do not disturb the DNAPL. If the lenses of DNAPL were disturbed, the DNAPL might spread, be moved by the groundwater, or disperse, and thereby become much more difficult to attack. Also, the injection should be done gently enough to leave the treatment material as a coherent whole disc. The use of the terms ejected and injected should not be inferred as indicating that the liquid is sprayed or jetted, but rather, in the invention, the emphasis is that the treatment liquid is gently placed or positioned in the aquifer, so the ejected volume of treatment liquid can be expected to remain as a coherent unit.

The invention has been described as it relates to the treatment of DNAPL contaminants. However, the invention can be used in certain other cases.

DNAPL has the property that it coalesces and collects in lenses that remain stationary or static, even though the groundwater is moving through the aquifer at its characteristic velocity. It is possible for contamination of other kinds to collect in more or less stationary accumulations or lenses, even where the contaminant is neither dense, nor non-aqueous.

Other types of contaminant, especially after the contaminant has been in the ground a long time, can be found to have become sorbed into particular areas of the aquifer, where they remain more or less static.

Many, if not most, aquifers are stratified to a marked degree, with horizontal (or nearly horizontal) layers of silt, or other lower-permeability material, appearing in the overall sand and gravel matrix. Indeed, even the sand/gravel areas themselves can be markedly stratified. The resistance to flow of liquids within the aquifer is often more or less uniform. But the resistance to flow when measured at different locations, can be highly non-uniform. In addition to being non-uniform, generally the resistance to flow is markedly greater in the vertical direction. Consequently, dense liquids tend to flow horizontally, along the strata, filtering down from layer to layer.

As explained, DNAPL liquids tend to form static lenses in certain areas of the aquifer. However, it has been found that other contaminating liquids, in an aquifer, can form what amount to static lenses. Many types of liquids can become sorbed out of solution, into silt areas, even though the liquid may pass through sand and gravel more or less cleanly, without leaving any deposit.

In most aquifers, the water flows through the aquifer very much along the preferred pathways, and the groundwater in the areas between the pathways can be more or less static. Consequently, after contaminant has been in the ground over a period of years, what can happen is that some of the more silty areas or layers of the aquifer can contain accumulations of sorbed liquid contaminant, while the rest of the aquifer is substantially clean. So long as the groundwater passes along the preferred pathways, this might not be troublesome, in that the groundwater might avoid picking up any contaminant as it passes through the sand and gravel. But some of the passing groundwater might pass near enough to the accumulation of contaminant, and, in passing, might pick up enough of the contaminant, and take it into solution, as to be of concern.

It will be understood that these accumulated lenses of sorbed contaminant resting within the less permeable areas, can be like the as-described lenses of DNAPL resting on top of the less-permeable areas. The lenses tend to collect in the silty areas and layers, and the passing groundwater can take up traces of the contaminant into solution. However, the effect can be the same, that the lenses of the contaminating liquid are close enough to the passing streams of groundwater to release contaminant into solution in the groundwater, and yet still the lenses of contaminating liquid are in areas of the aquifer that are very difficult to reach by conventional methods such as flushing, even when the attempt is made to saturate or flood the whole volume of the aquifer with large quantities of the treatment liquid.

Thus, although it appears to be a characteristic mainly of DNAPLs that they tend to collect in coalesced static lenses, it is recognised that other types of liquid can display the same effect. It should be understood that, just as the invention can be used to focus the delivery of dense treatment material onto the lenses of DNAPL, so the invention may be used to focus delivery of treatment material to these sorbed accumulations of other contaminants.

As mentioned, the lenses of DNAPL tend to reside on top of the silt layers, rather than in them; this makes the DNAPL lenses easier to reach, using the invention, especially when the treatment liquid is dense. When the contaminant liquid has become sorbed into the silt layer, rather than just resting on the silt layer, the treatment material can still be dense, and can be deposited above the sorbed zone; however, the mechanism by which the treatment material travels from the point at which it was deposited, to reach the contaminant, may be a mechanism other than density flow. For example, the treatment liquid can be caused to diffuse into the silt layer, by concentration diffusion. Here, the molecules of the treatment liquid move most vigorously into areas where the concentration of the treatment liquid is high, to areas where it is low. Thus, as the treatment liquid is used up (because it reacts with the contaminant, and becomes degraded) so the concentration drops, and more treatment liquid is drawn in.

Thus, the system of the invention is at its most advantageous when used with treatment liquid that is dense, and which moves by gravity, from the location where the liquid is positioned after injection, down onto the lenses of contaminant. However, the invention may be used with other treatment liquids, whereby the mechanism that drives the treatment liquid from the location where the liquid is positioned just after injection, towards contact with the contaminant, might be driven by a concentration difference or gradient, for example, rather than by a density difference or gradient. Furthermore, although the invention is most advantageous when the contaminant is DNAPL, because the lenses of DNAPL, resting on the silt layers, are fairly well accessible to the treatment liquid when delivered by the system of the invention, the system of the invention can be used with other contaminants, e.g those that have become sorbed into the silt layers.

Once the treatment liquid does contact the contaminant, the degradation reaction quickly takes place, whereby the treatment liquid is used up, and its concentration drops rapidly; thus, the fact that the treatment liquid is used up causes the concentration gradient to be maximised. The use of concentration and other gradients to drive treatment liquids into contact with contaminants is not new in itself; what is new here is the recognition that, when the liquids are injected using the system of the invention, these mechanisms can be used, as a matter of practical operational effectiveness, in ordinary aquifers, and with contaminants that have become resident in places that, with previous systems for inserting the treatment liquid, have been almost impossible to reach.

The system of the invention makes use of the stratification characteristic that is present in most aquifers, to enable treatment liquid to be injected into the ground in the form of discs of treatment material. It has been found that, in an aquifer, the injection can be done gently enough basically not to displace the contaminant during the injection process. It has been found that the resulting injected disc can be at least a meter in radius in very many aquifers, and in some cases larger than that, even though the disc remains only a few centimeters thick, when the injection is done using the equipment and procedures as outlined.

It has been found that the treatment liquid in the disc, just after injection, remains concentrated enough for the treatment liquid to be driven through the ground, either downwards by gravity, or, by concentration gradient (i.e into areas where the concentration is less), or by other gradient mechanisms and combinations of mechanisms. It has been found that the focussed-delivery system that is an intended result of one aspect of the invention, is most readily achievable when the treatment liquid is dense, and the contaminant comprises DNAPL resting in lenses on top of lower-permeability layers, even though these lenses have been difficult to reach with previous delivery systems; but, as mentioned, the delivery system can also be used with drive mechanisms other than density, and with contaminants that are even less accessible with conventional methods; and even in those cases it has been found that the concentration of the treatment liquid can last long enough for the driving mechanism to be useful, and for degradation of the contaminant to take place.

It has been found that, at least when compared with flushing, the amount of treatment material that needs to be injected into the ground is minimised. The inject-and-leave, focussed-delivery, system means that a designated zone can be adequately covered with treatment liquid, as to its lateral and vertical extents. Of course, not all of the treatment liquid can be expected to be utilised efficiently, to degrade contaminants. But the treatment system is much more efficient than flushing, with corresponding savings in quantities of liquids, and in the energy required to place the liquid in contact with the contaminant.

As described, the invention can be used to advantage with permanganate (not necessarily potassium permanganate—for example sodium permanganate can be utilised) and other strong chemical oxidants. However, other chemicals can be injected using the system of the invention. For example, solutions that stimulate natural micro-organisms to cause break down of the contaminants, can be injected. Also, although permanganate breaks down chlorinated ethenes quickly, it will also break down other many organic chemical compounds.

A key feature of the invention is the ability for the system to be used to inject discs of treatment material into high permeability areas, and for the injected treatment liquid to then percolate into the lower-permeability areas, and this can be done with treatment liquids than permanganate solutions, and with other contaminants than DNAPL chlorinated ethenes.

As described, a key aspect of the invention lies in forming coherent discs of treatment liquid in the aquifer soil. In order that the discs can be formed, the factors that need to be in place will now be considered, first as to the natural conditions that need to be present in the aquifer, and second as to what conditions need to be engineered.

In order for discs to form at all, in the manner of the invention, the aquifer itself must be generally permeable, and the aquifer must be stratified. However, permeability and stratification, as properties of aquifers, of course do vary, and the type (i.e size) of disc that can be formed in any given aquifer varies in accordance. Irrespective of how carefully the engineering is done, in a particular case, the size of disc that can be formed is limited by the permeability and stratification of that particular aquifer.

The efficiencies that can be achieved by the invention are maximised when the treatment liquid is injected in such a manner that the lateral spread of the disc is the maximum that is achievable in that kind of aquifer, and (theoretically) no more; it will be understood that further injection of treatment liquid beyond that point only causes the disc to increase in vertical thickness, not in horizontal diameter, during injection.

After injection of the disc has been completed, the treatment liquid permeates downwards through the aquifer, because the treatment liquid is more dense than the groundwater. Of course, the disc of treatment liquid does not remain as a sharply-defined coherent disc, as it descends. The liquid in the disc descends by fingering down through cracks and crannies in the stratified pores of the aquifer. As it descends, the treatment liquid spreads and diffuses, and loses concentration, and as it loses concentration it loses density; so, inevitably, there comes a point at which the treatment liquid has diffused and reacted so much that it no longer has the density to descend through the water.

However, it is recognised that, with a treatment liquid such as permanganate solution, the disc of liquid can be expected to descend, by virtue of its extra density, through a distance that will be measured in meters—i.e in a very permeable aquifer, perhaps three or more meters, and, in an aquifer that is near the limit of impermeability, still perhaps one meter over a period of time. The rate at which the treatment liquid descends of course also varies; but, generally, the period during which the treatment liquid descends through the aquifer material, while still retaining enough concentration to be effective to treat such contaminant as it may encounter, and retaining enough density to continue its descent, that descending-period is from a few days to a few weeks.

It is important that the treatment liquid not break down or degrade during this descending-period. This is why a fast-break-down oxidant, such as hydrogen peroxide, would not be favoured for use in the invention, whereas permanganate is more stable, and can be expected to retain its potency as an oxidant over the days or weeks of the descending-period, under conditions that might cause peroxide to break down.

Immediately upon injection, it will be understood that the disc is physically well-defined. Immediately upon injection, it is possible, e.g by the use of probes and sampling, to determine exactly the location of the periphery of the disc, since the periphery is well-defined and easy to map: the concentration of the treatment liquid does not fall (much) during injection, so that, at the edges of the disc, the treatment liquid is either present at (nearly) full concentration, or not present at all. The disc will not be perfectly circular, of course, but its average diameter can be readily determined, by probing.

It should not be considered that the injected disc retains its characteristic shape as a sharply-defined coherent disc, as it descends, with clear water filling in behind (i.e filling in above) the disc, as it descends. As mentioned, the treatment liquid starts, from its initial location in the injected disc, to finger down through the cracks and crannies in the aquifer. As a result, the disc of treatment liquid soon loses its characteristic shape, as a disc.

However, consider the effect of the descending treatment liquid at a point Z of the aquifer, below the injected disc: at first, the concentration of treatment liquid at point Z is zero; then, the concentration increases to a maximum as the treatment liquid approaches and envelopes the point Z; and then, the concentration of treatment liquid reverts back—not to zero, but at least it will drop to a lower value—as the treatment liquid moves down past the point Z.

It is emphasized, again, that the injection of the disc is not intended as a means for flooding or flushing a whole treatment volume of the aquifer with concentrated treatment liquid, all at once—but rather, the injection of the disc is intended as a means for subjecting points below the disc to a passing sweep-through of concentrated treatment liquid.

It may be regarded that the improvement in efficiency arising from the invention, as compared with flooding or flushing the whole treatment volume of the aquifer with high-concentration treatment liquid, is revealed by the extent to which the concentration of treatment liquid at point Z falls back, once the treatment liquid from the disc has descended, and passed by. In the invention, the whole treatment volume has been subjected to high-concentration treatment-liquid—but not all at once; the invention achieves treatment of the whole treatment volume, not by flooding, but by using gravity to vector the treatment liquid down through the treatment volume of the aquifer. Thus, only a relatively small amount of concentrated treatment liquid is effective to sweep through a large volume of aquifer.

In following the invention, the engineer basically should try to make the disc as large (horizontally) as possible. But, as mentioned, no matter how carefully the engineering is done, the nature of the aquifer itself limits the size of disc that can be produced.

Figures 6A, 6B:
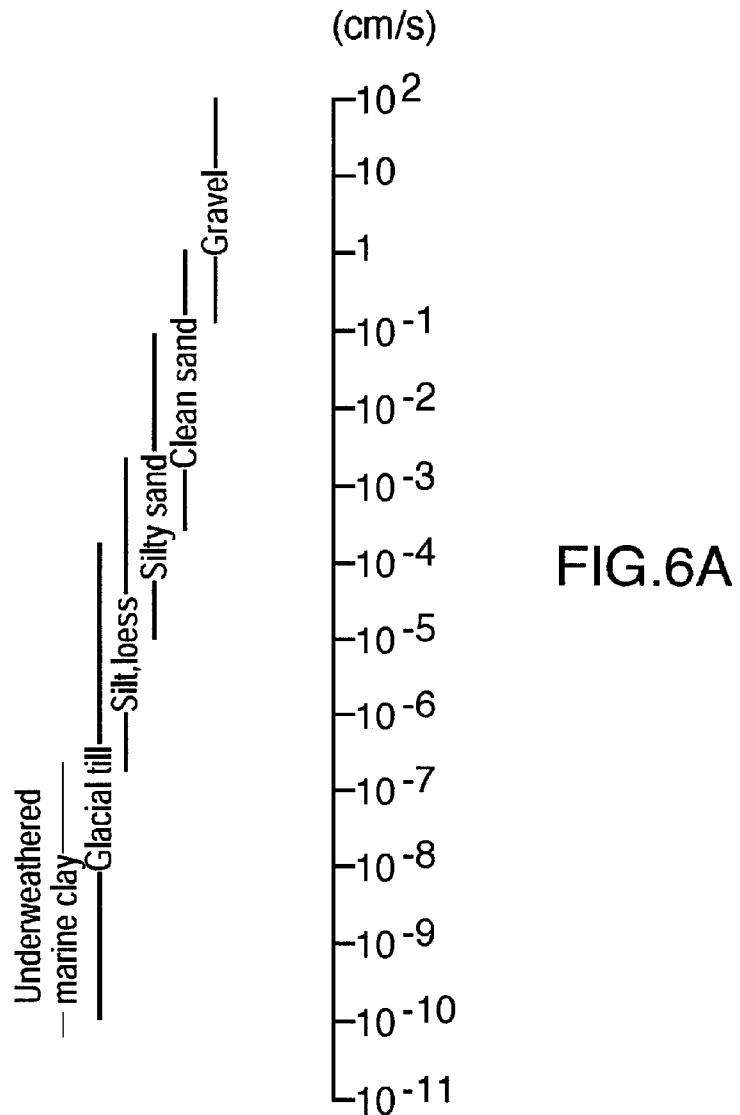
FIGS. 6a and 6b are tables which illustrate permeabilities of various aquifer types.

FIGS. 6a,6b shows the hydraulic conductivity of various types of aquifer material. In addition to the permeability, or hydraulic conductivity, of the aquifer, another important parameter is the degree of stratification. This varies from a minimum stratification, in which the vertical permeability is as close to the horizontal permeability as is encountered in real aquifers. It is not claimed that the invention can be practised in all aquifers, but it should be noted that even the least stratified aquifers likely to be encountered still are stratified enough to enable the discs, as described herein, to be formed. This is because the grains that make up the aquifer, being non-uniform in shape, tended to settle with their flat dimension disposed horizontally, with the result that water can pass through the aquifer more readily horizontally than vertically, even when all the grains are nominally of the same size. In addition, of course, any variations there might be in grain size tend to lie in horizontal layers, which only increases the stratification. In the maximum stratified aquifer likely to be encountered, the aquifer may include layers of fine silty material, closely intercalated with bands or layers of loose sand. While it is not ruled out, an aquifer that is so highly stratified that the treatment liquid cannot be made to descend effectively at all, would be very unusual. Besides, if the aquifer is so highly stratified that the treatment liquid cannot penetrate vertically, presumably the dense pollutants will not have penetrated vertically either.

In FIGS. 6a,6b, the hydraulic conductivity is expressed as cm/sec. Permeability, or hydraulic conductivity, can be expressed in different ways. In this specification, the figure for hydraulic conductivity of an aquifer, as expressed in meters per second, represents the number of cubic meters of liquid passing, with a velocity having direction X, through one square meter of cross-sectional area of the aquifer lying normal to direction X, per second, per unit of pressure gradient applied in the direction X. Conventionally, the unit of applied pressure gradient is one meter of water head, per meter of the aquifer measured along direction X, and thus is unity. Expressed in cm/sec, of course the coefficient is 100 times the meters per second figure.

The efficiency benefit of the invention arises mainly because a relatively large volume of aquifer can be treated by a relatively small volume of treatment liquid. In the interests of efficiency, the engineer should not just simply carry on injecting large volumes at each injection point, simply flooding the aquifer with treatment liquid. Rather, he should stop injecting, once the disc is as wide, horizontally, as it can be.

There are a number of ways by which the engineer can determine, in a particular case, when the disc has reached its maximum lateral expansion, and injection should be discontinued. For example, direct measurements, using probes, may be carried out. In the absence of direct and specific indicators, the engineer may refer to a look-up table, in which the volume of liquid to be injected from each injection point is read off in accordance with the type of aquifer. FIGS. 7a,7b provide an example of such a look-up table. It is stressed that the tables of FIGS. 7a,7b are examples of the kind of look-up table that may be provided for the use of the engineer, practising the invention; more, or different, classes or types of aquifer, and types of engineering factor, may be evaluated, and the accuracy of the figures may be refined.

In the use of the tables of FIGS. 7a,7b, the engineer should first determine what kind of aquifer is present at the location at which the injections are to be made. Typically, an aquifer will be in the mid-range of permeability, and the mid-range of stratification. The four types of aquifer specified in FIG. 7a are: 1. loose, well-stratified; 2. loose, not-well-stratified; 3. tight, well-stratified; and 4. tight, not-well-stratified. These may regarded as the four corners of a square, and any aquifer in which the invention can readily be practiced will fall somewhere within the square. The point in the square at which a particular aquifer falls can be readily determined by everyday measurements and observations of samples at the site. Of course, an aquifer has other important characteristics that affect the formation of the disc, apart from the hydraulic conductivity and degree of stratification. For example, in one aquifer the strata might be well-marked, and close together; in another aquifer the strata might be equally well-marked, but far apart, and that can make a difference. However, it is recognised that the two characteristics are not only very significant, but also are easily measurable. (The invention may be practiced in aquifers that fall outside the square, but not so advantageously.)

FIG. 7a shows what kind of discs can be made in the different types of aquifer, as detailed.

FIG. 7a also shows the effective depth to which, in the particular aquifer, it can be expected that permanganate solution will penetrate before losing potency as an oxidant. The time it takes for the treatment liquid to penetrate to that depth should be read on the basis that there is no contaminant present; if the treatment liquid encounters contaminant, it can appear to be descending much more slowly, in that the treatment liquid breaks down as it attacks the contaminant.

It should be understood that the maximum size of disc that can be injected in an aquifer is a property of the aquifer, and assumes the injection is engineered perfectly. FIG. 7b shows the factors the engineer should adjust and control, according to the type of aquifer, in order to achieve the favourable disc formation and action as indicated in FIG. 7a. The details of FIG. 7b are now considered in more detail.

The Volume of Treatment Liquid Injected per Injection-point per Injection-episode.

The more open and permeable the aquifer, the less liquid is present in the "best" disc for that aquifer. The more stratification, generally, the more liquid is contained in the "best" disc. The figures represent these effects. The volumes mentioned are the recommended volumes at which the engineer should stop injecting, on the grounds that if more liquid is injected, it will just go into vertical thickening of the disc, not into increasing the disc's horizontal diameter.

The Flow-Rate at Which the Treatment Liquid is Injected, and the Injection Pressure.

The engineer can adjust the pressure in order to give a certain flow rate of the permanganate solution out of the port. The injection can be done more slowly, but the engineer will normally wish to accomplish the injection quickly, for the usual economic reasons. The injection rate figures of ten liters per minute in a loose aquifer, and four liters per minute in a tight aquifer, are typical of what the engineer should be aiming for. To achieve a faster injection rate, the engineer would have to increase the injection pressure.

Excess pressure can cause pathways to open up. Less pressure should be applied to the finer, tighter, aquifers, because too high a pressure in a tight aquifer can cause premature vertical fingering of the liquid, before the disc has fully formed horizontally. The preference is for the liquid to expand radially outwards, over a wide front, through the existing network of pathways, rather than to burst out through new pathways. In each case, it may be regarded that it will take one to two hours to inject the disc; the looser the aquifer the faster the liquid can be injected, but the greater the volume, whereby the time taken is about the same. The engineer preferably should carry out experiments with the first few discs to be injected, starting at the lower pressures and working up, so as to make sure, from sampling and measurements, that the aquifer is not being disrupted.

The Vertical Spacing Between Injection Points, or Between Injection Episodes.

If it is desired to focus the treatment liquid onto a known lens of DNAPL, at a specific depth, the question of vertical separation need not arise. But when it is desired to blanket the treatment liquid down through a whole treatment volume of the aquifer, several discs may be provided, spaced apart vertically at regular spacings. The spacing figures in FIG. 7b represent the length of the blank space between the discs, i.e the vertical length over which no injection takes place. The vertical separation may be achieved by providing several injection ports in one drill, or by providing one injection port per drill, and raising/lowering the drill to the required port-heights. (The term "drill" does not necessarily imply rotation: the drill may be e.g directly pushed or hammered into the ground.)

The Horizontal Spacing Between Injection Points.

Again, if it is desired to focus the treatment liquid onto a known lens of DNAPL, the question of horizontal spacing need not arise. But when it is desired to have the treatment liquid blanket a whole area of the aquifer, several boreholes should be provided, spaced on e.g a regular grid. Ideally, the horizontal grid spacing should be such that the discs just overlap at their fullest horizontal expansion. Generally, the horizontal spacing will be achieved using just one drill; having completed the several discs at the various depths in the first borehole, the one drill is taken out of the first borehole, and moved to the next borehole site on the grid.

The Time Spacing Between Injection Episodes.

In many cases where the invention is employed, it is necessary to repeat the injections, and form new discs, perhaps several times, in order to adequately treat all the contaminant. However, the repetitions should be well spaced apart, in time. The efficiencies of the invention arise because a large treatment volume of the aquifer can be treated by the use of a relatively small volume of concentrated treatment liquid, and that efficiency is negated if too much treatment liquid is used. The minimum time between repeats at any one disc-injection site should be regarded as about three days; that is to say, having injected a treatment volume, and having formed a good disc, at an injection point, it would be contra-indicated, in the invention, to inject any more treatment liquid at that same injection point, until a minimum of three days has elapsed. In this regard, the expression "at that same injection point" should be considered as follows: given that it will often not be possible to place the drill back in exactly the same place, "at the same injection point" means within half a meter vertically, and one meter horizontally, of the injection point. Although a repeat after three days might be indicated in some cases, e.g where large concentrated volumes of pollutant are present, and where the type of aquifer favours rapid descent of the treatment liquid, it will be understood that, normally, the period between repeat injections, at the same injection point, would be more like three weeks.

The Port Height.

The more stratified the aquifer, i.e the more contrast there is between the lower-permeability strata and the high-permeability strata, the more the engineer can expect the disc to be of large diameter, and narrow thickness. The height of the aquifer over which the liquid is ejected also affects the vertical thickness of the disc. Thus, for well-stratified aquifers, the height of the port should be smaller, especially if the strata themselves are close together. If the injection were to be done over a port height of more than about one meter, it would be virtually impossible for the discs of the invention to be properly formed. The engineer should examine the samples of the aquifer: if the aquifer material is e.g well-streaked with bands of silt, a height of the port of about 15 cm would be regarded as the practical maximum; if the aquifer is of more average stratification, the maximum port height would be about 30 cm, and if the aquifer is at the only-lightly stratified end of the scale, the maximum port height would be in the 50 or 100 cm range. As indicated, these are maximum port heights: preferably, the port height should be kept smaller than those figures. In the interests of keeping total injection time to a minimum, the engineer will wish to use a long port height. Given that the aquifer is divided into strata of high permeability intercalated with strata of lower permeability, and the discs are formed in the strata of high permeability, the port height preferably should be arranged so as not to bridge over more than one high-permeability layer. The engineer will be able to determine, from the data obtained from samples at the site, whether the strata might be so closely spaced that special small port heights are required. The port heights indicated in FIG. 7b are by way of suggested starting points for the engineer to try.

The above factors are dependent, as indicated, on the type of aquifer, rather than on the type of contaminant. Of course, the contaminant must be considered also, as to its chemical nature, and as to its physical disposition within the aquifer. Generally, best results will be achieved by the use of a highly concentrated solution of the treatment liquid. However, in some cases, the engineer might decide to clean up the pollutant by attacking it in solution, rather than by attacking the static lenses of pollutant. In that case, the concentration of the treatment liquid solution should be weaker; the dissolved contaminant is present in the water only in small traces, which can be dealt with using light solutions. When attacking large concentrated lenses of DNAPL, potassium permanganate solution of around 5 grams per liter, or more, is suitable; when attacking dissolved DNAPL, a stronger solution would be more appropriate.

The figures given in FIG. 7b should be regarded as the points from which to start, in cases where the contaminants are dispersed, i.e not particularly confined to a small number of large lenses, and where the engineer wishes to proceed with a minimum of sampling, etc. But in a case where the engineer knows, e.g from pre-sampling, that the aquifer is largely empty of contamination, except for a huge lens of DNAPL resting on a lower-permeability layer, of course it is more appropriate then to address that lens directly, than to blanket large volumes of the whole aquifer.

The manner in which the disc expands, as liquid is injected, will now be considered in more detail. When treatment liquid is injected so as to form a disc, the treatment liquid spreads horizontally, radially, away from the injection point, but also, inevitably, it spreads vertically. It will be understood that each liter of injected liquid causes the (average) diameter of the disc to increase a horizontal distance-increment dx cm, and also causes the vertical thickness of the disc to increase a vertical distance-increment dz cm. What happens is that, at first, the horizontal increment dx of the disc per liter of injected liquid far exceeds the vertical increment dz per liter; i.e that, at first, dx/dl is large and dz/dl is small. In fact, as injection proceeds, it can happen, in some aquifers, that many liters can be ejected from the injection point with virtually no vertical spreading at all.

As the limit of the disc diameter approaches, now the horizontal dx/dl dwindles, while the vertical dz/dl starts to increase. It is recognised, in the invention, that the point at which the engineer should stop injecting any more treatment liquid is dependent upon the point at which the changeover occurs from the $$dx/dl=\text{large}, dz/dl=\text{small}$$

condition to the $$dx/dl=\text{small}, dz/dl=\text{large}$$

condition. As mentioned, this changeover can be detected, either by direct measurement, with probes, if the injection point is accessible. On the other hand, in some aquifers, especially those that are loose, but well-stratified, there will be no clear changeover from horizontal expansion to vertical expansion.

As may be seen from FIG. 7a, even in the most favourable aquifers, the disc cannot be expected to be coherent beyond an average diameter in the three to five meter range. In the least favourable aquifers, the maximum disc that can be produced might be barely one meter diameter.

In terms of the efficiency of the usage of treatment liquid, it may be regarded that if the engineer carries on injecting more liters, beyond the liters required to make the disc expand to its fullest lateral extent, the less he is using gravity and density-difference as the mechanism for distributing the treatment liquid through the aquifer, and, consequently, the more treatment liquid will be used, overall. Of course, in practice, the prudent engineer will inject a little more treatment liquid than is theoretically necessary, as a safety margin. But there is a large difference between the liters needed to form a disc that will be effective to treat a large volume of aquifer underneath the disc, even with a safety margin added, as compared with the liters of treatment liquid needed to flood or flush that same volume completely with treatment liquid.

It will be understood that the treatment volume to be injected at each injection point will be some hundreds of liters. As mentioned, this volume should be injected gently enough so as not to displace the contaminant, and certainly so as not to lift or otherwise physically disrupt the particles of the aquifer. In a real installation, the engineer will normally wish to get on with injecting the liquid as quickly as possible, so a lower limit of injection rate would not come under consideration. However, it should be noted that if the injection is done too slowly, the liquid then might descend as it is being injected, whereby it might never reach its potential for lateral expansion, i.e the treatment liquid would fall down through the aquifer without first forming a disc. The whole treatment volume should be injected quickly enough that the liquid substantially does not start to fall until the disc is complete. Typically, this means that the injection of the whole treatment volume from its injection point should be done in less than a day; and quicker than that, if the groundwater has a large lateral velocity.

The invention enables efficiencies to be realised in terms of the number of liters of treatment liquid that are required to treat X cubic meters of aquifer. Of course, if the aquifer is very contaminated, many injection episodes will be needed, over a long period of time. The savings arise in that the invention enables a disc having a thickness of e.g 20 cm to sweep through perhaps one or two meters of aquifer. It might be considered that the engineer should simply inject more liters of treatment solution during each an injection episode—and thereby pick up even more of the contaminant—and thus save the bother of going back for further injection episodes at later dates. However, the engineer should take care not to inject too much, per injection episode. Every liter of injected treatment liquid displaces a liter of contaminated water, and the greater the vertical depth of the injected treatment liquid, the more contaminated water is pushed aside, laterally, where it will not be treated by the descending treatment liquid. Thus, injecting too much treatment solution is not only wasteful of treatment solution, but it actually leads to less of the contaminated groundwater being treated. In the invention, the aim is that the descending permanganate will pick up not only the static lenses of undissolved DNAPL, but also the DNAPL already dissolved in the groundwater, which it cannot do if the contaminated groundwater has been pushed aside.

As mentioned, the figures for the liters of injected liquid as given in FIG. 7b should be regarded as the amounts that will give the most economical results, but the engineer will usually prefer to inject rather more than that. From the standpoint of making sure not to inject too much, as just explained, the engineer should make sure not to inject more than about twice the number of liters, per injection episode, as indicated in FIG. 7b for the particular type of aquifer.

If the engineer is aiming for maximum savings in terms of the volume of treatment liquid employed, and is willing to sacrifice a little on the diameter of the discs, the engineer may prefer to inject fewer liters than the figures indicated in FIG. 7b. However, it would hardly be worthwhile trying to form the discs at all, in the context of the invention, if the liters injected were less than about half the figures indicated in FIG. 7b.

As mentioned, the permeability and stratification of the aquifer are major factors in determining what diameter of disc can be formed in a particular aquifer. However, a four-meter disc should not be regarded as simply a scaled-up copy of a two-meter diameter disc.

Figures 8, 9:
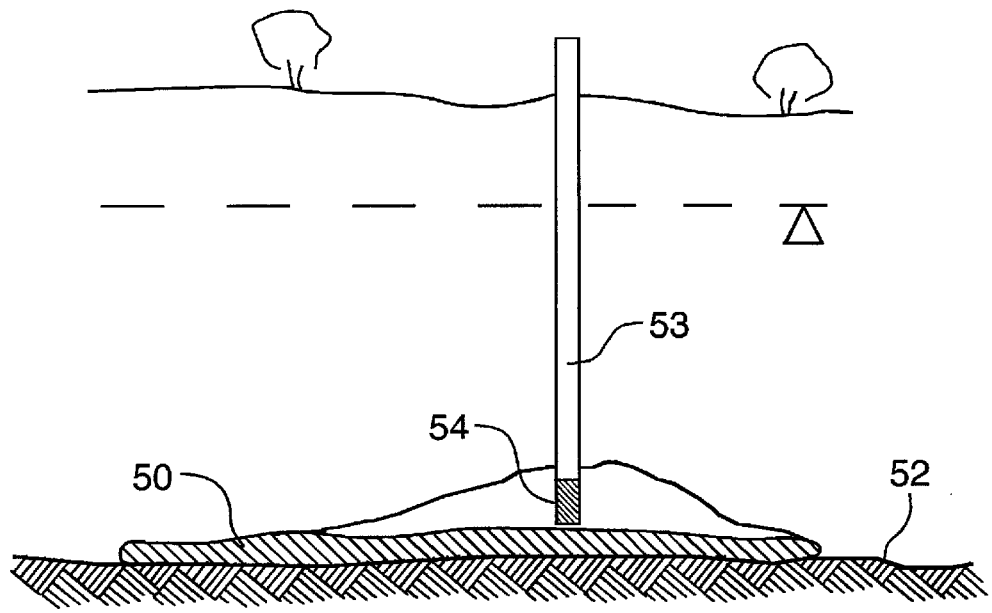
FIG. 8 is a table showing the relationship between various parameters of an Injected treatment volume.
FIG. 9 is a cross-section of an aquifer, and shows a manner of treating a contaminant that embodies the Invention.

FIG. 8 is a table that shows the manner in which the diameter of the treatment-lens, as injected, is related to other parameters. (The fact that the dimension is termed a diameter should not be construed as a limitation that the outside of the disc is circular. Diameter refers to the distance overall, and the average diameter is the average of diameters taken at various orientations.)

FIG. 8 assumes that each disc has an aspect ratio that is a function of its diameter. Thus, a disc of 2 meters diameter has an aspect ratio of 4:1, i.e a vertical height H of 50 cm. A disc of 4 meters diameter has an aspect ratio of 8:1, which again has a height of 50 cm.

The shape factor takes account of the fact that a small disc, insofar as it approximates to the shape of a mathematical figure, approximates to an ellipsoid, whereas a large disc approximates more to the shape of a double-cone. A true ellipsoid has a shape factor of 0.166, representing $\frac{1}{6}.Pi.D^2.H$, and a true double-cone has a shape factor of 0.083, representing $\frac{1}{12}.Pi.D^2.H$. For the purpose of compiling the table, it is assumed there is a smooth change from ellipsoid to double-cone, as the diameter D of the disc increases.

Permeability and stratification vary a great deal between aquifers, which is why only a two-meter disc might be all that is possible in one aquifer, whereas a five-meter disc might be possible in another. The porosity of the aquifers does not vary much, and it is assumed, in the table, that all the aquifers have a porosity of 30%, whereby the pore volume of the aquifer is 30% of the geometrical volume of the aquifer. The volume of liquid injected from the port, to form the disc, occupies the pore volume.

A disc that occupies about 1.5 meters diameter of the aquifer will contain, according to FIG. 8, a volume of 175 liters; whereas a disc that occupies 5 meters diameter will contain just under 1000 liters. It should be understood that, of course, a real disc will not really be round and regular, and follow FIG. 8 exactly: however, experience shows that the volumes indicated in the table of FIG. 8 are similar to the volumes likely to be used in practice.

Again, it is emphasized that the discs mentioned in FIG. 8 are presented as the most efficiently-performing that can be achieved, given the limitations of the particular aquifer. The size the most efficient disc will be can be estimated beforehand, from a knowledge of the permeability and stratification of the aquifer. Further measurements and samples from the aquifer, as the work progresses, will enable the figure to be refined. If the aquifer will only support a 1.5-meter disc, there is no point in injecting 1000 liters or more through the port, into the aquifer, because the excess volume will just spread up and down, and not laterally outwards. This is inefficient as compared with the treatment systems as described herein, in which the treatment liquid from the disc is left to sweep downwards through the aquifer, by gravity; simply flooding or flushing the whole treatment volume of the aquifer with treatment liquid leads to the very inefficiencies the invention seeks to avoid. The best or most efficient disc is one in which the injection is continued so long as the diameter continues to increase incrementally per increment of volume added to the disc, but which stops when the diameter no longer increases per increment of added volume. When it has been determined what is the maximal diameter D of the disc that can be injected in a particular aquifer, the engineer should see to it that the volume injected from the port, to achieve that diameter, preferably should be at least the volume indicated in FIG. 8 for that diameter, but should not be more than about twice that volume; this latter will provide a margin to cater for the errors and ignorances likely to be encountered in practice, without wasting too much treatment liquid.

As described, the invention may be used to break down DNAPL that has settled into static lenses, on lower-permeability strata. In another aspect, the invention may be used to break down and remove dissolved contaminant from groundwater, for example from a plume of contamination in the groundwater emanating from one of the lenses of DNAPL. In this other aspect, of addressing the dissolved phase of the contaminant, of course, if there are any undissolved lenses, or blobs, of DNAPL in the water, those would be picked up also. The invention may be used, in the one aspect, to "focus" the treatment liquid down onto the lens of contaminant, knowing where the lens is; in the other aspect, the invention may be used to "sweep" down through a defined zone of the aquifer with treatment liquid, where it either not known where the contaminant is exactly, or it is known that the contaminant is ubiquitous. In both the "focus" and the "sweep" cases, the invention makes use of the fact that a dense treatment liquid can be forced from a port in such a manner that the liquid expands laterally and forms a disc, and then the disc starts, because of its density, to permeate down through the aquifer. In both cases, large volumes of the aquifer can be treated with small volumes of treatment liquid, which leads to a marked improvement in efficiency, as determined by the number of liters of treatment liquid that are needed to clean up a given volume of aquifer.

The "sweep-down" aspect of the invention may be summarised as follows.

By arranging for the treatment liquid to be so injected as to form discs, as described, it is a simple matter to design the system such that the volume of treatment liquid is less than half the volume of the aquifer that will be treated. By contrast, the technique of flushing or flooding the whole treatment zone of the aquifer with treatment liquid of course requires the whole pore volume of the aquifer to be filled with treatment liquid. When injecting discs into a permeable aquifer, a saving of half the treatment liquid is, as mentioned, simple to achieve; but it is possible to become much more efficient still. A good working improvement in efficiency is realised when the volume of treatment liquid is only one fifth of the volume being treated.

In the "sweep-down" aspect of the invention, preferably several discs are injected in one borehole. Also, several boreholes are arranged, in plan view, in a grid. the discs are so spaced, vertically and horizontally, so as to cause a minimum volume of the treatment liquid to sweep down through a maximum volume of aquifer. The vertical spacing of the discs is determined by the desire to achieve the most efficient use of the liters of treatment liquid.

If the discs are at the small end of the diametral range of sizes, the discs can be spaced apart by a corresponding small amount. A spacing of 10 cm per 100 liters of injected liquid can be expected to give good results. In cases where there is a good deal of contaminant present in the groundwater, either dissolved or in the free state, the engineer might wish to inject an excess of treatment liquid, on the basis that the treatment liquid will be used up as it encounters the contaminant. However, when using the disc-creating systems as described herein, the 10 cm of spacing between discs, per 100 liters of liquid injected into the upper disc, should mean that the aquifer never comes close to being flooded with treatment liquid.

Unless large volumes of contaminant are present in the zone of the aquifer being treated, and if the port height through which the liquid is being injected is less than about 60 cm, preferably the discs should be arranged on a vertical pitch spacing of no less than about 1.5 meters.

In the invention, as mentioned, it is important not to inject too much treatment liquid. This is true not only in terms of the vertical spacing between discs, and the lateral grid spacing between bore-holes, but it is true also of the time period after an injection episode. In carrying out the treatment, the engineer should see to it that each disc injected is as large in lateral extent as can reasonably achieved, and then the episode of injection should stop. (As mentioned, if large quantities of the contaminant are present, some extra liquid may be injected, per episode.) There should be no repeat of the injection at that location (i.e within about 0.5 meters vertically, and 1 meter horizontal) for a refrain-period, of three days minimum. Typically, the refrain period might be a week, or a month. For most efficient operation, the discs of treatment liquid should be left alone long enough for the treatment liquid to permeate down as far as it will go, before further injections are done. After that, repeat injections may be done, which again are aimed at producing a large disc, and then stopping. By this means, successive "waves" of treatment liquid can be made to sweep down through the aquifer.

When not actually injecting a disc, the injector may be switched off. However, when moving the drill up and down a borehole, it is generally a good practice to ensure that a small flow is maintained through the port, to keep the port open and unclogged.

In yet another aspect of the invention, the lateral spreading-out effect that can be achieved by injecting discs of a dense treatment liquid can be utilised in another way. As shown in FIG. 9, a large lens 50 of DNAPL has settled on the bottom of an aquifer, i.e on the bed-layer of clay 52.

A drill 53 has been placed into the aquifer, and a port 54 is located just above the lens 50 of DNAPL. Upon injection, the treatment liquid emerges from the port, and, being more dense than the groundwater, spreads laterally over the bed-layer 52, and over the DNAPL 50. The treatment liquid can be made to travel considerable lateral distances by this means.

What is claimed is:

1. Procedure for treating contaminated groundwater in its native aquifer, wherein:

the material of the aquifer is porous, and the aquifer is permeable to the through-flow of groundwater, at least laterally, to the extent that liquid readily moves and spreads laterally through the pore spaces in the aquifer;

the aquifer has a hydraulic conductivity greater than $10^{-6}$ cm/sec;

the aquifer includes a bed-layer, which has a hydraulic conductivity lower than $10^{-7}$ cm/sec;

the contaminant is a dense non-aqueous-phase liquid, which has settled on the bed-layer, and is in the form of a liquid lens, of comparatively small vertical height and large lateral extent;

the procedure includes introducing treatment liquid into the aquifer, and of injecting the treatment-liquid in the form of a coherent layer of the treatment-liquid, termed a treatment-lens;

the treatment-liquid is concentrated enough to cause chemical breakdown of the DNAPL contaminants in the groundwater;

the treatment-liquid is substantially more dense than the groundwater, whereby, upon injection of the treatment liquid into the aquifer, the treatment liquid starts to sink down;

and the procedure includes the steps of so placing the treatment-lens of the treatment-liquid in the aquifer as to overlie a portion of the lens of DNAPL, just above the lens, whereby the dense treatment-liquid, in sinking, spreads out progressively laterally for a large distance, over the bed-layer and over the lens of DNAPL.

2. Procedure of claim 1, wherein the dense treatment liquid is a solution of permanganate, of more than 1 gram per liter concentration.

3. Procedure of claim 1, wherein the procedure is carried out by:

providing an injecting structure, having an injection-port, and providing a means for injecting treatment liquid through the port, under pressure, into the aquifer;

placing the injecting-structure down into the aquifer, until the port is located just above the DNAPL;

and then injecting the treatment liquid out through the port.

4. Procedure for treating contaminated groundwater in its native aquifer, wherein:

the material of the aquifer is porous, and the aquifer is permeable to the through-flow of groundwater;

the porous material of the aquifer is stratified, to the extent that liquid readily moves and spreads laterally through the pore spaces in the aquifer, following the lie of the strata, to a substantially greater degree than the liquid moves and spreads vertically;

the aquifer has a hydraulic conductivity greater than $10^{-6}$ centimeters per second;

the procedure includes introducing a quantity of treatment-liquid into the aquifer;

introducing the treatment-liquid in the form of a coherent layer of the treatment-liquid, termed a treatment-lens;

so placing the treatment-lens in the aquifer as to overlie a treatment-zone of the aquifer;

immediately upon the treatment-lens being formed in the aquifer, the treatment-lens comprises a volume VL cubic meters of treatment-liquid, and the treatment-liquid occupies a volume VL cubic meters of aquifer-pore-volume, termed the lens-pore-volume;

the lens-pore-volume of the aquifer, being the volume of the aquifer-pore-volume occupied by the treatment-lens immediately upon the treatment-lens being formed, has an average lateral diameter of D meters, occupies a horizontal area of A square meters of the aquifer, and has an overall vertical thickness in the aquifer of Z meters;

the lens-pore-volume of the aquifer is disc-shaped, in that the aspect ratio of the treatment-lens, being the ratio of the diameter D of the lens-pore-volume to the vertical thickness Z of the lens-pore-volume, is at least two-to-one;

the treatment-liquid is concentrated enough to cause chemical breakdown of the contaminants in the groundwater; the treatment-liquid is substantially more dense than the groundwater, whereby the treatment liquid sinks down out of the lens-pore-volume and into an under-lens-pore-volume of the aquifer;

the under-lens-pore-volume is that zone of the aquifer-pore-volume that lies contiguously underneath the lens-pore-volume, and is the zone of the aquifer into which the dense treatment-liquid from the lens-pore-volume permeates down and through;

the nature of the aquifer is such that the dense treatment-liquid can permeate down through the under-lens-pore-volume of the aquifer, under gravity, by virtue of its density contrast with groundwater in the aquifer;

the nature of the aquifer is such that the dense treatment-liquid starts to permeate down from the lens-pore-volume, into and through the under-lens-pore-volume, immediately upon the treatment-lens being formed;

the procedure includes forming the treatment-lens in the aquifer over a relatively short period of time, and of then refraining from adding further treatment-liquid into a refrain-pore-volume of the aquifer, for a relatively long refrain-period of time, being RP days;

the refrain-period RP is at least three days;

the refrain-pore-volume includes both the lens-pore-volume and the portion of the under-lens-pore-volume that lies contiguously underneath the lens-pore-volume;

the refrain-pore-volume, being VR cubic meters, is greater than twice the lens-pore-volume VL.

5. Procedure of claim 4, wherein the refrain-pore-volume, VR, is greater than five times the lens-pore-volume.

6. Procedure of claim 4, wherein the groundwater is contaminated with a contaminant that includes a phase that is dissolved in the groundwater.

7. Procedure of claim 6, wherein contamination is substantially not present in the groundwater other than in the dissolved phase.

8. Procedure of claim 7, wherein the dense treatment liquid is a solution of permanganate, of more than 0.5 grams per liter concentration.

9. Procedure of claim 4, further including:
providing an injection-structure, which extends down from the ground surface into a contaminated region of the aquifer;
wherein the injection-structure includes a port, through which the treatment-liquid can be injected into the aquifer, a reservoir of the treatment-liquid, and an operable injector for injecting treatment-liquid through the port, into the aquifer, under pressure;
wherein the port is of such limited height, PH meters, as to enable the treatment-liquid, upon being injected, to form a treatment-disc of the said aspect-ratio or higher;
configuring the injection-structure and operating the injector in such a manner as to form a plurality of the treatment-lenses at the same plan-location, at different depths in the aquifer, one lens above the other;
in respect of one of the treatment-lenses, being treatment-lens A, the treatment-lens A, immediately upon being injected, lies separated from the adjacent treatment-lens below, being treatment-lens B, by a vertical-blank-spacing, VBS meters, being the distance in the aquifer between the highest point of lens B and the lowest point of lens A.

10. Procedure of claim 9, wherein the procedure includes:
determining the largest diameter of disc that that aquifer will support;
reading off the volume To be injected for that size of disc, from the table of FIG. 8;
injecting a treatment-volume of a magnitude that lies between the volume indicated in FIG. 8 and twice that volume.

11. Procedure of claim 9, wherein the port height PH is no more than about 60 centimeters, and the procedure includes arranging the discs on a vertical pitch spacing of about 1.5 meters, or greater.

12. Procedure of claim 9, wherein the vertical-blank-spacing VBS between adjacent treatment-lenses, is longer than about 10 centimeters for every 100 liters of the total volume VL of treatment-liquid injected to form the upper treatment-lens.

13. Procedure of claim 9, including setting the injection-structure so as to provide many boreholes, spaced apart laterally, and arranged in a grid pattern of such dimensions that the discs of treatment material, immediately upon injection, in plan-view, approximately just overlap.

14. Procedure of claim 9, including injecting a further treatment volume, after the refrain-period.

15. Procedure of claim 9, including carrying out measurements, and assessing whether the injected treatment-liquid is still able to break down further contaminant, and if not, injecting a further treatment-volume.

16. Procedure of claim 9, wherein the injection-structure is so arranged as to inject two or more discs, at different depths, in the same borehole;
and the procedure includes spacing the upper extremity of the port, when injecting a lower one of the discs, at least twice the height of the port vertically from the lower extremity of the port when injecting the adjacent upper disc.

17. Apparatus for treating groundwater in an aquifer, being groundwater that contains a contaminant, wherein;
the apparatus includes a porous aquifer, having a water-table, and containing groundwater, and the aquifer is permeable to the through-flow of groundwater, having a hydraulic conductivity of at least $10^{-6}$ cm/sec;

the apparatus includes a contaminant, which is present in the aquifer in the form of one or more substantially static lenses;

the apparatus includes a treatment material, and the contaminant is of the kind that is capable of being chemically transformed upon exposure thereof to the treatment material;

the treatment material comprises a liquid, which is substantially more dense than the groundwater, whereby the treatment liquid sinks down through the groundwater and down through the aquifer;

the apparatus includes an injection-structure, which extends down from the ground surface into a region of the aquifer containing one or more of the lenses of the contaminant;

the injection-structure includes a port, and the apparatus includes a means for injecting the treatment material, as a liquid, out into the aquifer material, from the port;

the porous material of the aquifer is stratified, to the extent that liquid injected out, under pressure, from the port in the injection-structure readily moves and spreads radially outwards, following the lie of the strata, to a substantially greater degree than the injected liquid moves and spreads vertically;

the porosity and permeability of the porous material of the aquifer is such that a dense liquid present within the porous material tends to percolate downwards gradually through the porous material;

the apparatus includes a means for injecting a treatment volume of the treatment liquid, out through the port;

whereby the treatment volume of the treatment liquid, upon being injected, spreads out laterally into the aquifer, and the treatment liquid then gradually percolates downwards through the aquifer, and into contact with the lens of contaminant.

18. Apparatus of claim 17, wherein:

the contaminant is, or is a component of, a dense, non-aqueous-phase liquid (DNAPL);

the DNAPL is a liquid that is substantially immiscible with the groundwater;

the DNAPL is a liquid that is substantially more dense than the groundwater, and the DNAPL is present in the aquifer in the sense that the DNAPL has sunk down through the groundwater and down through the aquifer, and has collected in the aquifer in discrete blobs or lenses each lens comprising a substantial volume of DNAPL.

19. Apparatus of claim 18, wherein the treatment material is a strong oxidant, and the DNAPL is of the kind that is broken down by a strong oxidant.

20. Apparatus of claim 19, wherein the treatment material is permanganate.

21. Apparatus of claim 20, wherein the permanganate is wholly dissolved in water prior to being injected, and the concentration of the solution is at least 1 gram per liter.

22. Apparatus of claim 17, wherein the injection-structure, containing the port, is so structured and arranged as to be capable of being lowered into and raised out of the ground.

23. Apparatus of claim 22, wherein the injection-structure comprises a drill, and the apparatus includes a means for driving the drill into the ground.

24. Apparatus of claim 17, wherein:

the port is adapted to eject treatment liquid uniformly all around the circumference of the injection-structure;

the port is adapted to eject treatment liquid only over a zone of narrow vertical extent;

the aquifer material is of such stratification that the treatment volume, immediately after being injected from the port, forms a disc;

in that the treatment volume spreads out radially for a meter or more, but occupies a substantially smaller vertical height.

25. Apparatus of claim 14, wherein the aquifer conditions are such that the groundwater has a lateral translational velocity of no more than 200 cm/day.

26. Apparatus of claim 17, wherein:

the injection-structure includes a plurality of the said ports, each at a different depth;

the apparatus includes an operable means for injecting treatment liquid from each of the ports;

the means for injecting treatment liquid is effective, when operated, to inject respective predetermined treatment volumes of treatment liquid individually from the ports.

27. Apparatus of claim 17, wherein the injection-structure is so arranged as to inject discs in several boreholes, arranged in a horizontal grid, the boreholes being spaced apart horizontally between 1 and 10 meters.

28. Apparatus of claim 17, wherein the apparatus includes a means for injecting the liquid from the port at a pressure below 150 psi.

29. Apparatus of claim 17, wherein the aquifer material comprises a general matrix of sand, streaked with layers of silt.

30. Apparatus of claim 17, wherein the port has a height over which the treatment liquid is ejected therefrom, of no more than 2 meters.

31. Apparatus of claim 17, wherein the port has a height over which the treatment liquid is ejected therefrom, of no more than 30 cm.

32. Apparatus of claim 17, wherein the port has a height over which the treatment liquid is ejected therefrom, of no more than 10 cm.

33. Apparatus of claim 17, wherein the apparatus includes operable means for injecting the treatment liquid episodically, comprising means for operating the means for injecting the said treatment volume of the liquid at an injection-point in the aquifer, being the point in the aquifer at which the port is located, from the port in a substantially continuous stream, and then for ceasing further injection at that same injection-point for a period of time.

34. Apparatus of claim 33, wherein the period of time is at least three days.

35. Apparatus of claim 33, wherein, in respect of the table set out in FIG. 7b hereof, the number of liters of treatment liquid ejected in one injection episode, in respect of the type of aquifer into which the treatment liquid is being injected, is at least the figure indicated in FIG. 7b for that type of aquifer, but is no more than twice that figure.

36. Apparatus of claim 33, wherein, in respect of the table set out in FIG. 7b hereof, the number of liters of treatment liquid ejected in one injection episode, in respect of the type of aquifer into which the treatment liquid is being injected, is no more than the figure indicated in FIG. 7b for that type of aquifer, but is at least half that figure.

37. Procedure for treating contaminated groundwater in an aquifer, comprising:

providing apparatus as claimed in claim 18, mapping the location, at least generally, of at least one of the lenses of DNAPL;

positioning the injection-structure generally above the as-mapped location of the lens.

* * * * *